(12) United States Patent
Yoshigahara et al.

(10) Patent No.: US 11,657,609 B2
(45) Date of Patent: May 23, 2023

(54) TERMINAL DEVICE, INFORMATION PROCESSING DEVICE, OBJECT IDENTIFYING METHOD, PROGRAM, AND OBJECT IDENTIFYING SYSTEM

(71) Applicant: SONY CORPORATION, Tokyo (JP)

(72) Inventors: Takayuki Yoshigahara, Tokyo (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 117 days.

(21) Appl. No.: 17/315,966

(22) Filed: May 10, 2021

(65) Prior Publication Data
US 2021/0264200 A1 Aug. 26, 2021

Related U.S. Application Data

(63) Continuation of application No. 16/396,967, filed on Apr. 29, 2019, now Pat. No. 11,037,023, which is a
(Continued)

(30) Foreign Application Priority Data

Mar. 25, 2011 (JP) ................................ 2011-067965

(51) Int. Cl.
*G06T 19/00* (2011.01)
*G06F 18/2115* (2023.01)
(Continued)

(52) U.S. Cl.
CPC ........ *G06F 18/2115* (2023.01); *G06T 19/006* (2013.01); *G06V 10/10* (2022.01);
(Continued)

(58) Field of Classification Search
CPC .......... G06K 9/6231; G06K 9/22; G06K 9/46; G06K 9/6202; G06K 9/78; G06K 9/228;
(Continued)

(56) References Cited

U.S. PATENT DOCUMENTS

| | | |
|---|---|---|
| 6,208,353 B1 | 3/2001 | Ayer et al. |
| 8,819,116 B1 | 8/2014 | Tomay et al. |

(Continued)

FOREIGN PATENT DOCUMENTS

| | | |
|---|---|---|
| EP | 2428915 A2 | 3/2012 |
| JP | 2003-111128 A | 4/2003 |

(Continued)

OTHER PUBLICATIONS

Mar. 31, 2015, JP communication issued for related JP application No. 2011-067965.

(Continued)

*Primary Examiner* — Siamak Harandi
(74) *Attorney, Agent, or Firm* — Paratus Law Group, PLLC

(57) ABSTRACT

A device, apparatus, and method provide logic for processing information. In one implementation, a device may include an image acquisition unit configured to acquire an image, and a transmission unit configured to transmit information associated with the image to an information processing apparatus, such as a server. The server may be associated with a first feature quantity dictionary. The device also may include a receiving unit configured to receive a second feature quantity dictionary from the server in response to the transmission. The second feature quantity dictionary may include less information than the first feature quantity dictionary, and the server may generate the second feature quantity dictionary based on the image information and the first feature quantity dictionary. The device may include an identification unit configured to identify an object within the image using the second feature quantity dictionary.

18 Claims, 18 Drawing Sheets

Related U.S. Application Data continuation of application No. 15/926,367, filed on Mar. 20, 2018, now Pat. No. 10,311,333, which is a continuation of application No. 14/951,801, filed on Nov. 25, 2015, now Pat. No. 9,971,957, which is a continuation of application No. 13/424,114, filed on Mar. 19, 2012, now Pat. No. 9,256,796.

(51) Int. Cl.
  *G06V 10/10* (2022.01)
  *G06V 10/40* (2022.01)
  *G06V 10/75* (2022.01)
  *G06V 30/142* (2022.01)

(52) U.S. Cl.
  CPC .............. *G06V 10/17* (2022.01); *G06V 10/40* (2022.01); *G06V 10/751* (2022.01); *G06V 30/142* (2022.01)

(58) Field of Classification Search
  CPC .. G06K 9/00671; G06T 19/006; G06V 10/10; G06V 10/17; G06V 10/40; G06V 10/751; G06V 30/142; G06V 20/20
  See application file for complete search history.

(56) References Cited

U.S. PATENT DOCUMENTS

| | | |
|---|---|---|
| 2003/0195926 A1 | 10/2003 | Miyazaki |
| 2004/0179736 A1* | 9/2004 | Yin ................ G07C 9/00 382/224 |
| 2005/0016523 A1 | 1/2005 | Yeung |
| 2008/0147730 A1 | 6/2008 | Lee et al. |
| 2009/0063431 A1 | 3/2009 | Erol et al. |
| 2010/0034468 A1 | 2/2010 | Boncyk et al. |

FOREIGN PATENT DOCUMENTS

| | | |
|---|---|---|
| JP | 2003-331288 A | 11/2003 |
| JP | 2005-332205 A | 12/2005 |
| JP | 4492036 | 6/2010 |
| WO | WO 2010/026170 A1 | 3/2010 |

OTHER PUBLICATIONS

Mustafa Ozuysal, et al., "Fast Keypoint Recognition Using Random Ferns", Ecole Polytechnique Federale de Lausanne (EPFL), Nov. 7, 2008, p. 1-30, Computer Vision Laboratory, I&C Faculty, CH-1015 Lausanne, Switzerland.

Andrew J. Davidson, "Real Time Simultaneous Localisation and Mapping with a Single Camera", Robotics Research Group, Dept. of Engineering Science, University of Oxford, OX1 3PJ, UK, http://www.robots.ox.ac.uk/~ajd, Oct. 2003, p. 1-8.

(Herhatosmanoglu, Haakan; "Approximate Nearest Neighbor Searching in Multimedia Database"; 2001; IEEE, Data Engineering 2001. Proceedings. 17th International Conference).

(Takacs, Gabriel, "Outdoors Augmented Reality on Mobile Phone using Loxel-Based Visual Feature Organization"; MIR'08, Oct. 30-31, 2008, Vancouver, British Columbia, Canada).

English-language extended European Search Report in corresponding EP12 15 9181, dated Jul. 27, 2012.

Serge Belongie. "Shape Matching and Object Recognition Using Shape Contexts", IEEE Transactions on Pattern Analysis and Machine Intelligence, vol. 24, No. 24, pp. 509-522, Apr. 2002.

Herbert Bay et al., Speeded-Up Robust Features (SURF), Elsevier, Sep. 10, 2008, Switzerland, pp. 1-4.

David G. Lowe, "Distinctive Image Features from Scale-invariant Keypoints", International Journal of Computer Vision, pp. 1-28, 2004.

Mar. 28, 2016, Chinese Office Action for related CN Application No. 201210071370.5.

Jun. 15, 2016, European Office Action for related EP Application No. 12159181.2.

Fritz et al., "A Mobile Vision System for Urban Detection with Informative Local Descriptors", Proceedings of the Fourth IEEE International Conference on Computer Vision Systems, 2006, pp. 1-9, Computer Society.

Jan. 25, 2017, CN communication issued for related CN application No. 201210071370.5.

Vlahakis et al., ARCHEOGUIDE: First Results of an Augmented Reality, Mobile Computing System in Cultural Heritage Sites, Jan. 2001, 9 pages.

* cited by examiner

FIG.1
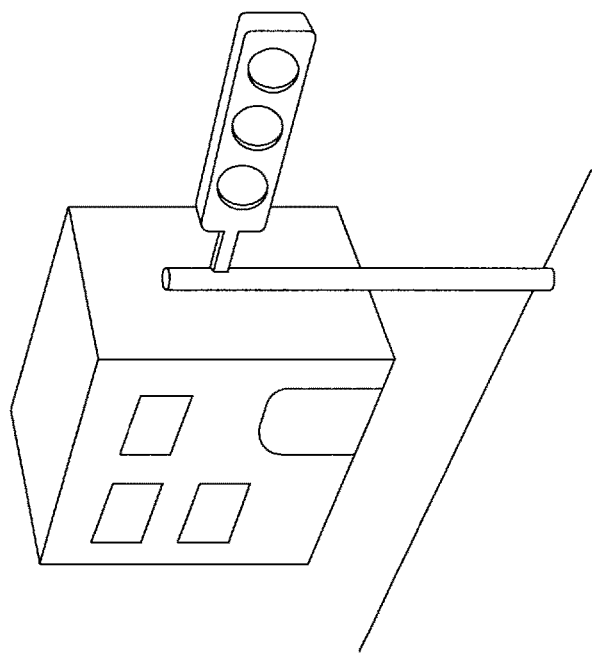
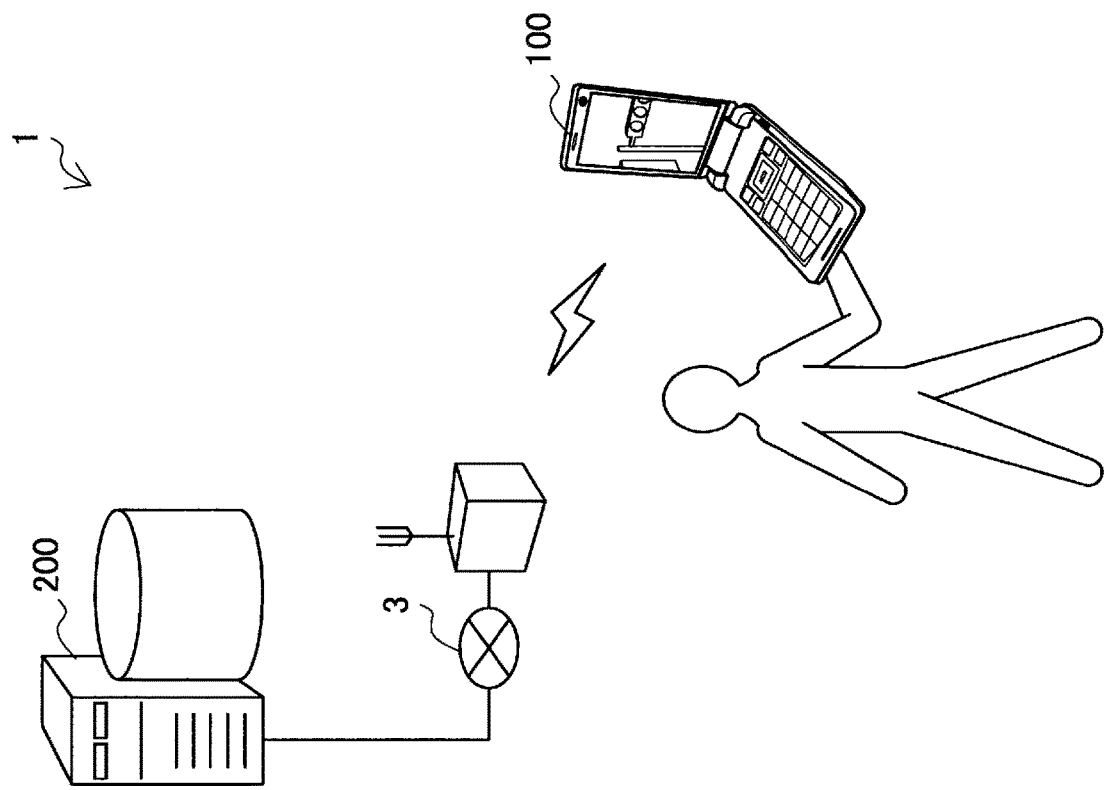

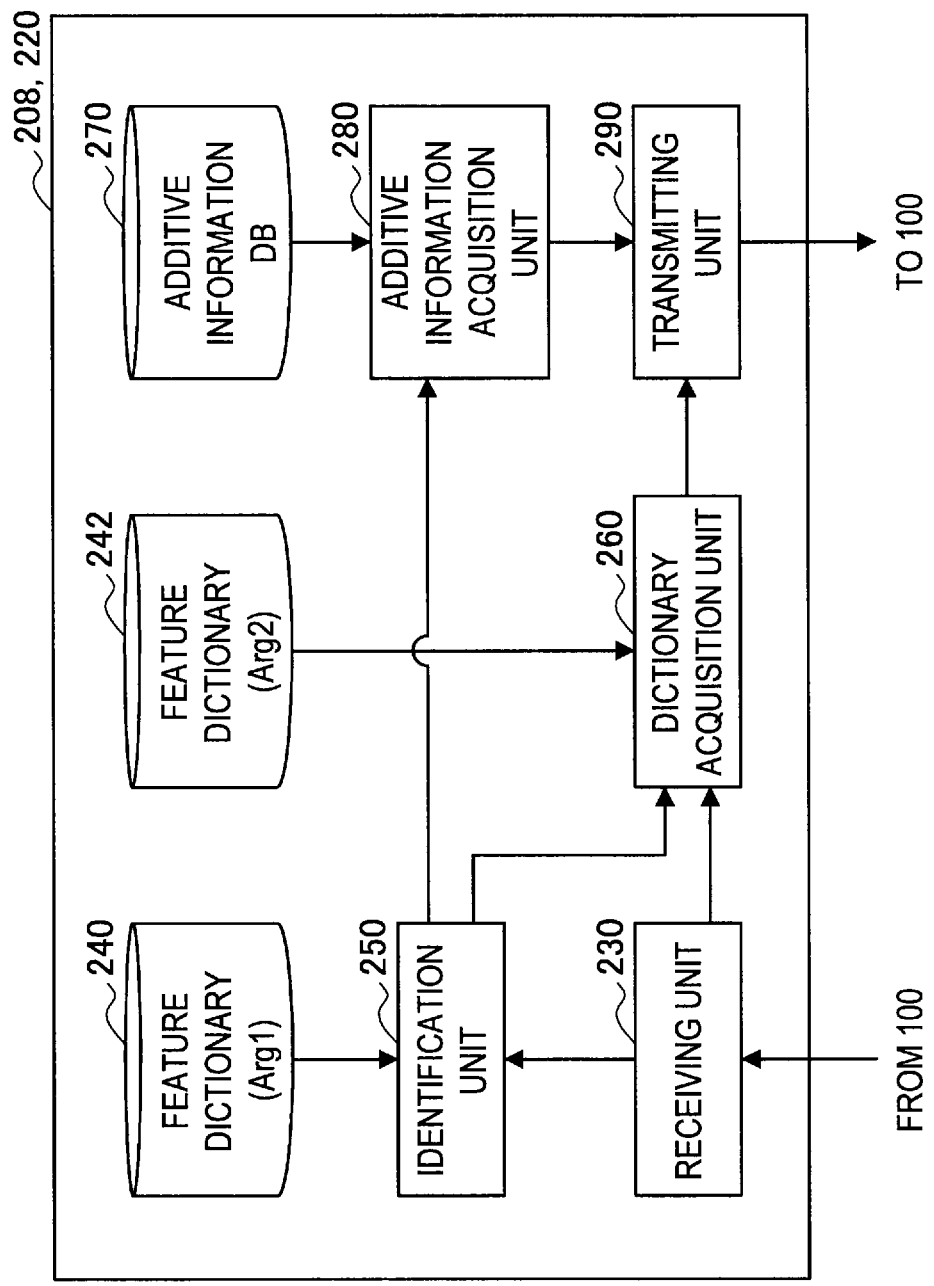

FIG.7

Feature Dictionary (High-Accuracy Algorithm) — 240

| OBJECT ID | NAME | FEATURE QUANTITY (Arg1) |
|---|---|---|
| $B_1$ | BUILDING A | ... |
| $B_2$ | BUILDING B | ... |
| $B_3$ | BUILDING C | ... |
| $B_4$ | TRAFFIC LIGHT D | ... |
| $B_5$ | VEHICLE E | ... |
| $B_6$ | BUILDING F | ... |
| $B_7$ | BUILDING G | ... |
| $B_8$ | SIGNBOARD H | ... |
| : | : | : |

Feature Dictionary (Lightweight Algorithm) — 242

| OBJECT ID | FEATURE QUANTITY (Arg2) |
|---|---|
| $B_1$ | ..... |
| $B_2$ | ..... |
| $B_3$ | ..... |
| $B_4$ | ..... |
| $B_5$ | ..... |
| $B_6$ | ..... |
| $B_7$ | ..... |
| $B_8$ | ..... |
| : | : |

| OBJECT ID | FEATURE QUANTITY (Arg1) | SCORE RANK |
|---|---|---|
| $B_1$ | ... | 1 |
| $B_2$ | ... | 2 |
| $B_3$ | ... | |
| $B_4$ | ... | |
| $B_5$ | ... | |
| $B_6$ | ... | k |
| $B_7$ | ... | k+1 |
| $B_8$ | ... | |
| : | : | |

242a

| OBJECT ID | FEATURE QUANTITY (Arg2) |
|---|---|
| $B_1$ | ..... |
| $B_2$ | ..... |
| : | : |
| $B_6$ | ..... |

DICTIONARY SUBSET (LIGHTWEIGHT ALGORITHM)

⇩

TRANSMIT TO TERMINAL

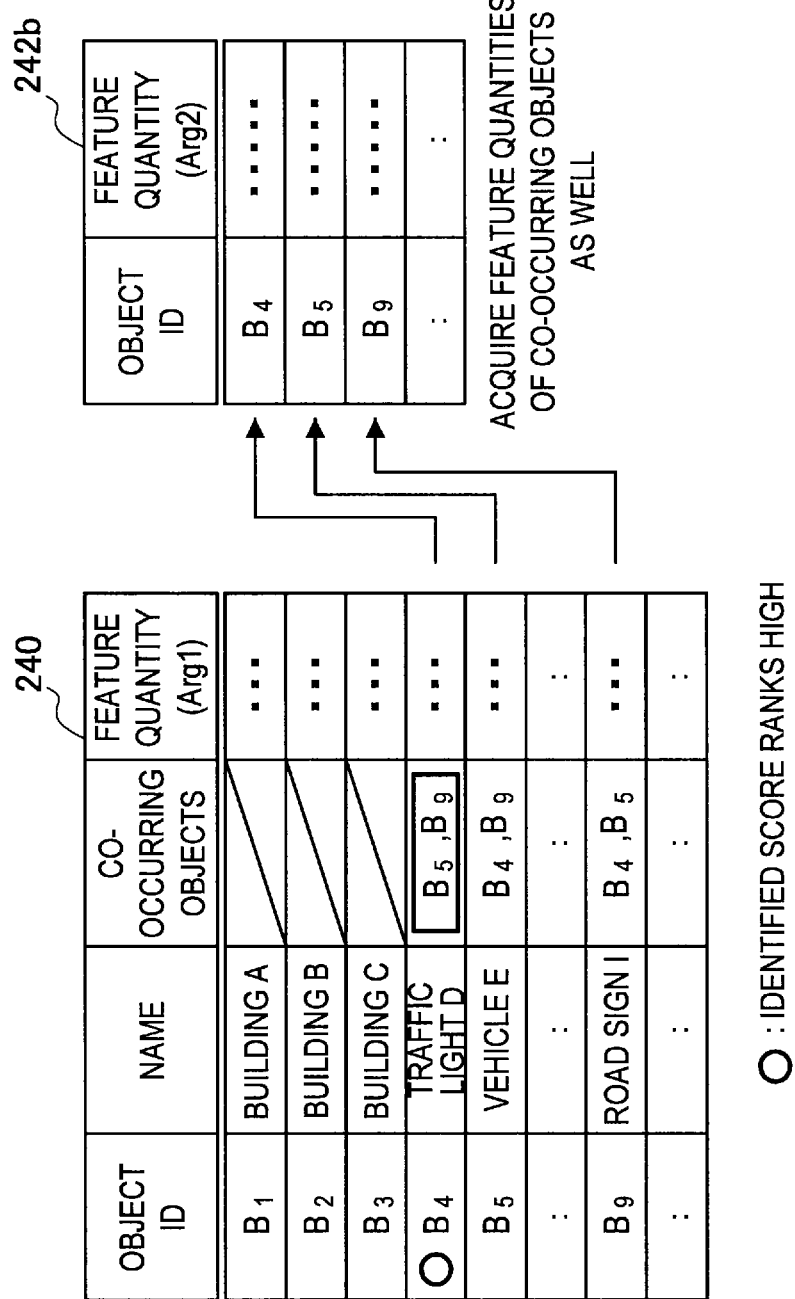

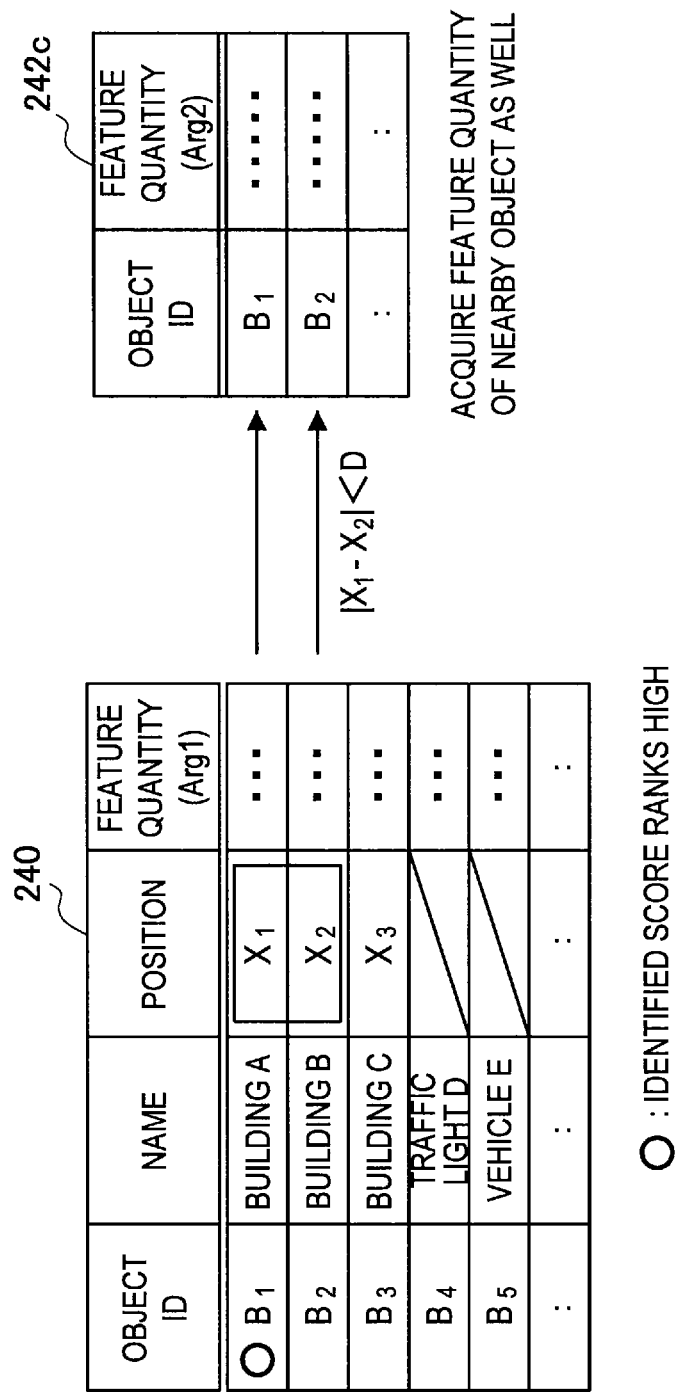

FIG.12

| OBJECT ID | NAME | ADDITIVE INFORMATION ||
|---|---|---|---|
| | | TYPE | CONTENT |
| B₁ | BUILDING A | ADVERTISEMENT | ····· |
| | | RATING | ····· |
| B₂ | BUILDING B | ADVERTISEMENT | ····· |
| B₄ | TRAFFIC LIGHT D | ATTENTION-SEEKING | ····· |
| B₅ | VEHICLE E | VEHICLE TYPE | ····· |
| ⋮ | ⋮ | ⋮ | ⋮ |

ADDITIVE INFORMATION DB

TERMINAL DEVICE, INFORMATION PROCESSING DEVICE, OBJECT IDENTIFYING METHOD, PROGRAM, AND OBJECT IDENTIFYING SYSTEM

CROSS-REFERENCE TO RELATED APPLICATIONS

This application is a continuation of U.S. patent application Ser. No. 16/396,967 (filed on Apr. 29, 2019), which is a continuation of U.S. patent application Ser. No. 15/926,367 (filed on Mar. 20, 2018 and issued as U.S. Pat. No. 10,311,333 on Jun. 4, 2019), which is a continuation of U.S. patent application Ser. No. 14/951,801 (filed on Nov. 25, 2015 and issued as U.S. Pat. No. 9,971,957 on May 15, 2018), which is a continuation of U.S. patent application Ser. No. 13/424,114 (filed on Mar. 19, 2012 and issued as U.S. Pat. No. 9,256,796 on Feb. 9, 2016), which claims priority to Japanese Patent Application No. 2011-067965 (filed on Mar. 25, 2011), which are all hereby incorporated by reference in their entirety.

BACKGROUND

Technical Field

The disclosed exemplary embodiments relate to a terminal device, an information processing device, an object identifying method, a program, and an object identifying system.

Description of the Related Art

With the advancement of image recognition technology in recent years, it has become possible to identify the position and attitude of an object in an image input from a camera, through matching of image feature quantities. One application of such object identification is an augmented reality (AR) application. In the AR application, a variety of information (e.g., advertising information, navigation information, or information for games) can be additionally displayed in an image of a building, a road, or other objects existing in the real world such that the information is associated with the object.

Japanese Patent Application Publication No. JP 4492036B proposes a feature extraction algorithm for identifying objects that has increased robustness against changes in the viewpoint, changes in luminance, and noise. Furthermore, Oezuysal proposes a feature extraction algorithm called "Random Ferns" that can operate at fast speed with a lower processing cost (See Mustafa Oezuysal. "Fast Keypoint Recognition using Random Ferns," IEEE Transactions on Pattern Analysis and Machine Intelligence, Vol. 32, No. 3, pp. 448-461, March 2010).

SUMMARY

As described above, feature extraction algorithms for identifying an object in an image come in a variety of types. However, typically, the higher the identification performance that an algorithm can realize, the higher the processing cost. Therefore, when object identification is performed on a device with a small amount of processing resources, such as a portable terminal, for example, there is a restriction on the identification performance (e.g., the accuracy of identification and the number of objects that can be identified concurrently). Meanwhile, when an image in each frame is transferred to a server with abundant processing resources to cause it to perform object identification, a delay caused by the wait time for a response from the server could hinder the rapid response of the application.

In light of the foregoing, it is desirable to provide a terminal device, an information processing device, an object identifying method, a program, and an object identifying system that can achieve higher object identification performance in a device with a small amount of processing resources.

Consistent with an exemplary embodiment, a device includes an image acquisition unit configured to acquire an first image, and a transmission unit configured to transmit information associated with the first image to a serv. The server may be associated with a first feature quantity dictionary. A receiving unit is configured to receive a second feature quantity dictionary from the server in response to the transmission. The second feature quantity dictionary includes less information than the first feature quantity dictionary. An identification unit is configured to identify an object within the first image using the second feature quantity dictionary.

Consistent with a further exemplary embodiment, a computer-implemented method includes acquiring a first image, and transmitting information associated with the first image to a server. The server is associated with a first feature quantity dictionary. A second feature quantity dictionary is received from the server in response to the tram mission. The second feature quantity dictionary includes less information than the first feature quantity dictionary. The method includes identifying, using a processor, an object within the first image using the second feature quantity dictionary, Consistent with another exemplary embodiment, a tangible, non-transitory computer-readable medium stores instructions that, when executed by at least one processor, cause the processor to perform a method that includes acquiring a first image and transmitting information associated with the first image to a server. The server is associated with a first feature quantity dictionary. A second feature quantity dictionary is received from the server in response to the transmission. The second feature quantity dictionary includes less information than the first feature quantity dictionary. The method includes identifying, using a processor, an object within the first image using the second feature quantity dictionary.

Consistent with an additional exemplary embodiment, an information processing apparatus includes a receiving unit configured to receive first information associated with a first image. An identification unit is configured to identify an object within the first image using a first feature quantity dictionary. The first feature quantity dictionary includes feature quantities of a plurality of objects. A generation unit is configured to obtain a second feature quantity dictionary in response to the identification. The second feature quantity dictionary includes less information than the first feature quantity dictionary. A transmission unit is configured to transmit the second feature quantity dictionary to a terminal device.

Consistent with a further exemplary embodiment, a computer-implemented method includes receiving first information associated with a first image, and identifying an object within the first image using a first feature quantity dictionary. The first feature quantity dictionary includes feature quantities of a plurality of objects. The method includes obtaining, using a processor, a second feature quantity dictionary in response to the identification. The second feature quantity dictionary includes less information than the first feature quantity dictionary. The method includes transmitting the second feature quantity dictionary to a terminal device.

Consistent with yet another exemplary embodiment, a tangible, non-transitory computer-readable medium stores instructions that, when executed by at least one processor, cause the processor to perform a method that includes receiving first information associated with a first image, and identifying an object within the first image using a first feature quantity dictionary. The first feature quantity dictionary includes feature quantities of a plurality of objects. The method includes obtaining a second feature quantity dictionary in response to the identification. The second feature quantity dictionary includes less information than the first feature quantity dictionary. The method includes transmitting the second feature quantity dictionary to a terminal device.

As described above, with the terminal device, the information processing device, the object identifying method, the program, and the object identifying system in accordance with the embodiments of the present disclosure, it is possible to achieve higher object identification performance in a device with a small amount of processing resources.

BRIEF DESCRIPTION OF THE DRAWINGS

FIG. 1 is an explanatory diagram illustrating a system overview in accordance with an exemplary embodiment;

FIG. 6 is a block diagram showing an exemplary configuration of the logical function of a dictionary saver in accordance with an embodiment;

FIG. 7 is an explanatory diagram illustrating an exemplary feature dictionary stored in a dictionary server in accordance with an exemplary embodiment;

FIG. 8 is an explanatory diagram illustrating a first example of a dictionary subset acquired by a dictionary saver, in accordance with an exemplary embodiment;

FIG. 9 is an explanatory diagram illustrating a second example of a dictionary subset acquired by a dictionary saver, in accordance with an exemplary embodiment;

FIG. 10 is an explanatory diagram illustrating a third example of a dictionary subset acquired by a dictionary server, in accordance with an exemplary embodiment;

FIG. 12 is an explanatory diagram illustrating exemplary data stored in an additive information database, in accordance with an exemplary embodiment;

DETAILED DESCRIPTION

Figure 2:
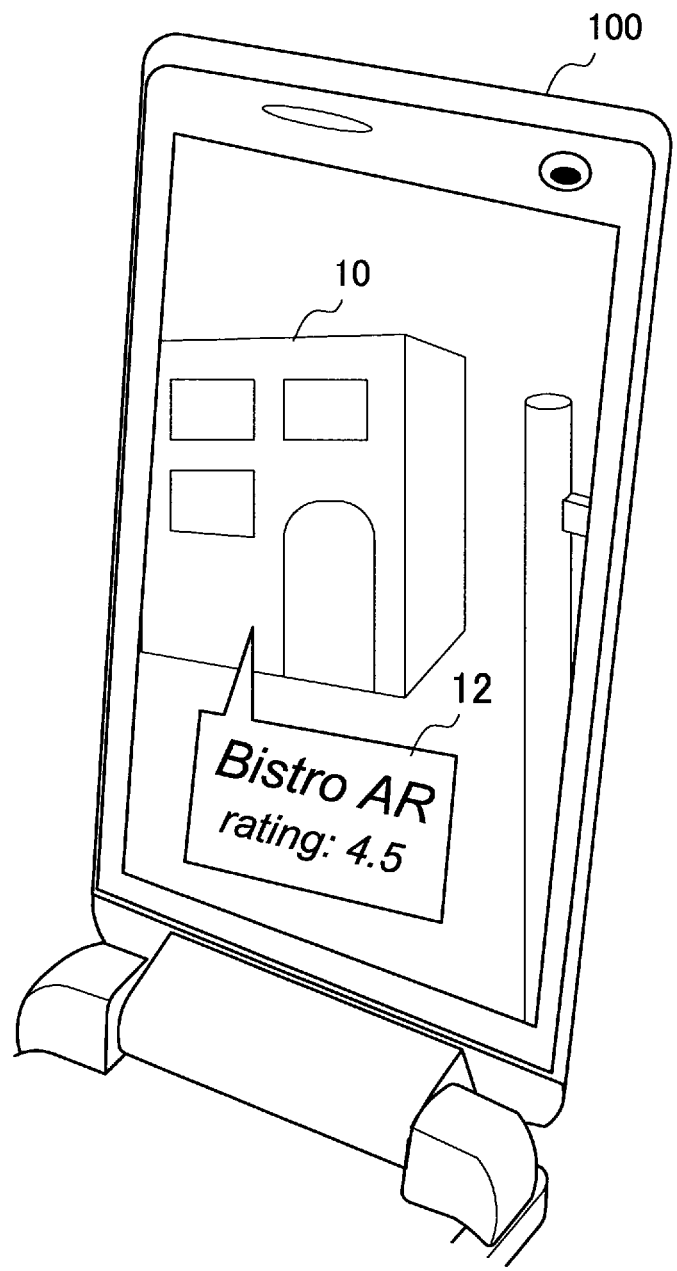
FIG. 2 is an explanatory diagram illustrating an image that can be displayed on a screen of a terminal device, in accordance with an exemplary embodiment.

Hereinafter, exemplary embodiments will be described in detail with reference to the appended drawings. Note that, in this specification and the appended drawings, structural elements that have substantially the same function and structure are demoted with the same reference numerals, and repeated explanation of the structural element is omitted.

The exemplary embodiments will be described in the following order

1. System Overview
2. Exemplary Configuration of the Terminal Device in accordance with an Exemplary Embodiment
   2-1. Hardware Configuration
   2-2. Logical Configuration
3. Exemplary Configuration of the Dictionary Server in accordance with an Exemplary Embodiment
   3-1. Hardware Configuration
   3-2. Logical Configuration
   3-3. Variation
4. Process Flow in accordance with an Exemplary Embodiment
   4-1. Processes on the Terminal Side
   4-2. Processes on the Server Side
5. Conclusion 1. System Overview FIG. 1 is an explanatory diagram illustrating an overview of an object identifying system to which the technology disclosed in this specification can be applied. Referring to FIG. 1, an object identifying system 1 in accordance with an exemplary embodiment is shown. The object identifying system 1 includes a terminal device 100 and a dictionary server 200.

The terminal device 100 is a device that identifies an object in an image captured by an imaging device. The terminal device 100 can be a portable terminal carried by a user, such as a smart phone or a PDA (Personal Digital Assistant). Alternatively, the terminal device 100 can be other types of device such as a PC (Personal Computer), a digital information home appliance, a game machine, or a robot used for operations. The imaging device can be incorporated in the terminal device 100. Alternatively, the imaging device can be provided outside the terminal device 100 and connected to the terminal device 100 by a cable or radio.

The terminal device 100, in identifying an object in an image, checks a feature quantity extracted from the image against a feature dictionary that is a set of known feature quantities for one or mom objects. Then, the terminal device 100, on the basis of a score calculated by the checking (hereinafter referred to as a "checked score"), identifies which object is in the image Note that in this specification, if a checked score for the feature quantity of a known object is "high," it means that there is a high possibility that the object is in the input image. For example, when the difference between a known feature quantity and the feature quantity of an input image at a particular position and attitude as close to zero, there is a high possibility that an object corresponding to the feature quantity is in the input image at that position and attitude. Such a circumstance will be referred to as a "high" checked score (even though the evaluated value of the difference is small). That is, the terminal device 100 can even identify the position and attitude of an object in an image. Various applications that use the result of such object identification can be mounted on the terminal device 100. This specification will mainly describe an example in which an AR application that uses the result of the object identification is mounted on the terminal device 100. However, in the terminal device 100, an application having a different objective (e.g., monitoring, recognizing the environment, or assisting in operations) can use the result of object identification.

The dictionary server 200 may be an information processing device that provides a feature dictionary for object identification to the terminal device 100. The dictionary server 200 communicates with the terminal device 100 over a network 3. The network 3 can be any types of network, such as the Internet, a provider network, or an intranet. In this exemplary embodiment, the dictionary server 200 receives an image from the terminal device 100. Then, the dictionary server 200 identifies an object in the received image, and provides a feature dictionary in accordance with the result of identification to the terminal device 100.

FIG. 2 is an explanatory diagram illustrating an image that can be displayed on a screen of the terminal device 100, consistent with an exemplary embodiment. For example, the image illustrated in FIG. 2 may be an image of an AR application. Referring to FIG. 2, an image of a building 10, which exists in the real space, is displayed on the screen of the terminal device 100. In addition, additive information 12 is overlaid on the image. The additive information 12 is information indicating the name and rating of a restaurant operated in the building 10. Such additive information is selected on the basis of the result of object identification in the terminal device 100, and is then overlaid on the image at a position corresponding to the object in the image. In this exemplary embodiment, a database of additive information that is overlaid on the image in this manner is also provided from the dictionary server 200 to the terminal device 100.

Figure 3:
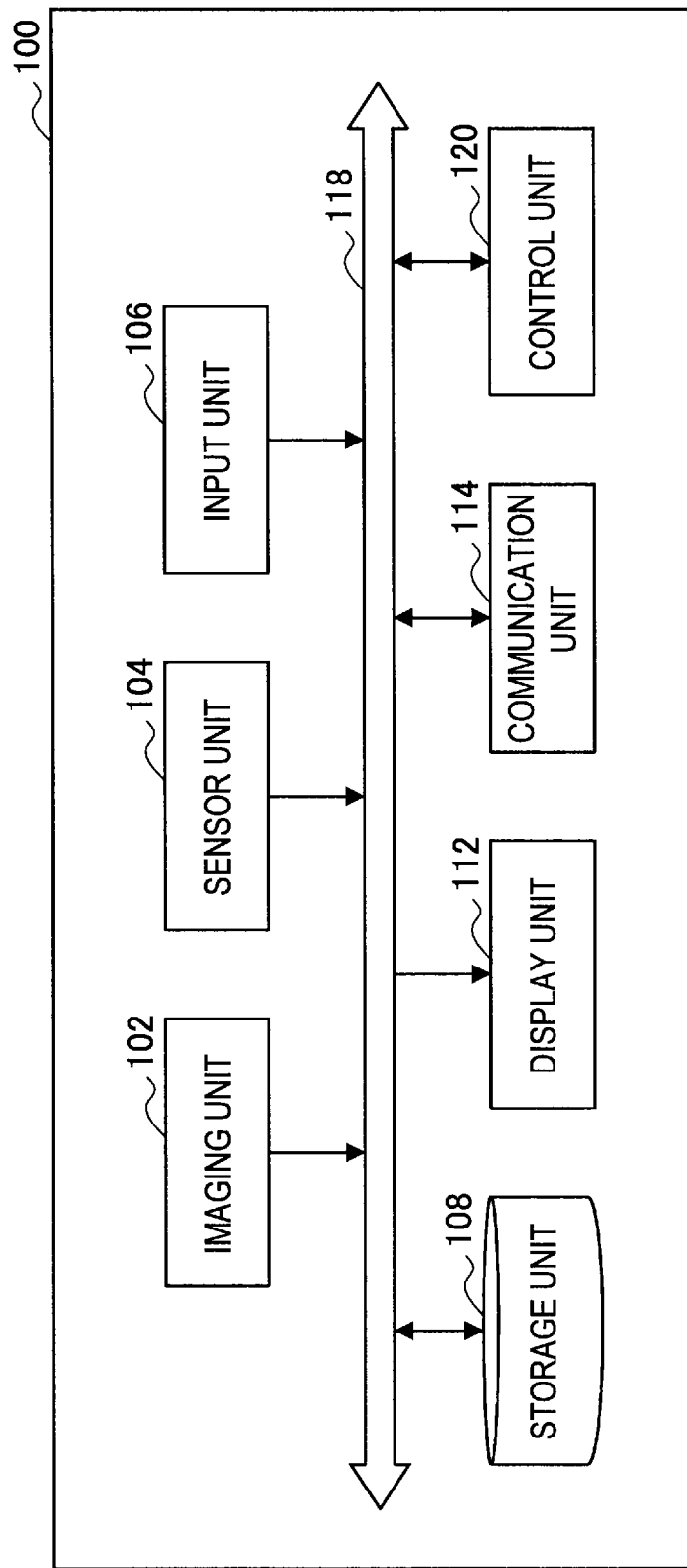
FIG. 3 is a block diagram showing an exemplary hardware configuration of a terminal device in accordance with an embodiment.

2. Exemplary Configuration of the Terminal Device in Accordance with an Exemplary Embodiment 2-1. Hardware Configuration FIG. 3 is a block diagram showing an exemplary hardware configuration of the terminal device 100 in accordance with this exemplary embodiment. Referring to FIG. 3, the terminal device 100 includes an imaging unit 102, a sensor unit 104, an input unit 106, a tangible, non-transitory computer-readable medium, an example of which is a storage unit 108, a display unit 112, a communication unit 114, a bus 118, and a control unit 120.

a. Imaging Unit

The imaging unit 102 is a camera module that captures images. The imaging unit 102 generates an input image for object identification by imaging the real space using an image sensor such as a CCD (Charge Coupled Device) or a CMOS (Complementary Metal Oxide Semiconductor).

b. Sensor Unit

The sensor unit 104 is a sensor group that assists in the recognition of the position and attitude of the terminal device 100. For example, the sensor unit 104 can include a GPS senor that receives a GPS (Global Positioning System) signal and measures the latitude, longitude, and altitude of the terminal device 100. In addition, the sensor unit 104 can include a positioning sensor that measures the position of the terminal device 100 on the basis of the intensity of a radio signal received from a wireless access point. Further, the sensor unit 104 can include a gyro sensor that measures the tilt angle of the terminal device 100, an accelerometer that measures the three-axis acceleration, or geomagnetic sensor that measures the orientation Note that when the terminal device 100 has a position estimation function and an attitude estimation function based on the image recognition, the sensor unit 104 can be omitted from the configuration of the terminal device 100.

c. Input Unit

The input unit 106 is an input device used for a user to operate the terminal device 100 or to input information to the terminal device 100. The input device 106 can include a keyboard, a keypad, a mouse, a button, a switch, a touch panel, or the like, for example. The input unit 106 can also include a gesture recognition module that recognizes a gesture of a user in an input image. Further, the input unit 106 can also include a line-of-sight detection module that detects the direction of the line of sight of a user wearing an HMD (Head Mounted Display) as a user input.

d. Storage Unit

The storage unit 108 includes a storage medium such as semiconductor memory or a hard disk, and stores programs and data to be used for processes performed by the terminal device 100. For example, the storage unit 108 temporally stores an input image generated by the imaging unit 102 and sensor data measured by the sensor unit 104. The storage unit 108 also stores data received form the dictionary server 200 via the communication unit 114. Examples of data received from the dictionary server 200 are described in detail below.

e. Display Unit

The display unit 112 is a display module including an LCD (Liquid Crystal Display), an OLED (Organic Light-Emitting Diode), or a CRT (Cathode Ray Tube). The display unit 112 displays an input image captured by the imaging unit 102, or an image of an application that uses the result of object identification (e.g., an image of an AR application exemplarily shown in FIG. 2) on the screen. The display unit 112 can be a part of the terminal device 100 or can be provided outside the terminal device 100. Alternatively, the display unit 112 can be an HMD worn by a user.

f. Communication Unit

The communication unit 114 is a communication interface that mediates the communication between the terminal device 100 and the dictionary saver 200. The commination unit 114 supports a given radio communication protocol or wire communication protocol, and establishes a communication connection with the dictionary server 200. Accordingly, it becomes possible for the terminal device 100 to transmit an image to the dictionary saver 200 and to receive a feature dictionary from the dictionary server 200.

g. Bus

The bus 118 mutually connects the imaging unit 102, the sensor unit 104, the input unit 106, the storage unit 108, the display unit 112, the communication unit 114, and the control unit 120.

h. Control Unit

The control unit 120 corresponds to a processor such as a CPU (Central Processing Unit) or a DSP (Digital Signal Processor). The control unit 120 causes a variety of functions of the terminal device 100 described below to operate by executing the programs stored in the storage unit 108 or another storage medium.

2-2. Logical Configuration

Figure 4:
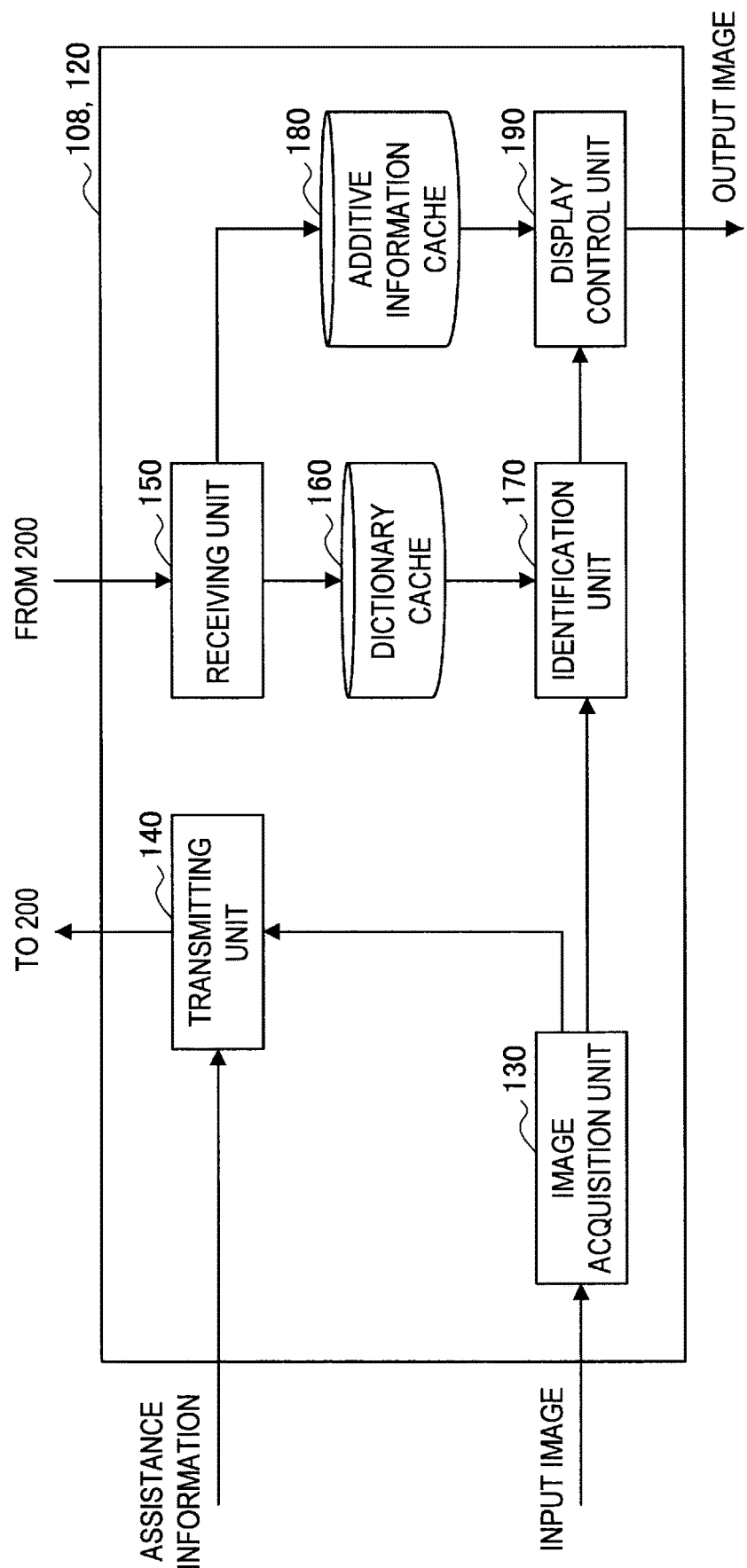
FIG. 4 is a block diagram showing an exemplary configuration of the logical function of a terminal device in accordance with an embodiment.

FIG. 4 is a block diagram showing an exemplary configuration of the logical function implemented by the storage unit 108 and the control unit 120 of the terminal device 100 shown in FIG. 3. Referring to FIG. 4, the terminal device 100 includes an image acquisition unit 130, a transmitting unit 140, a receiving unit 150, a dictionary cache 160, an identification unit 170, an additive information cache 1g0, and a display control unit 190.

a. Image Acquisition Unit

The image acquisition unit 130 acquires an input image generated by the imaging unit 102, men, the image acquisition unit 130 sequentially outputs the acquired input image to the transmitting unit 140 and the identification unit 170.

b. Transmitting Unit

The transmitting unit 140, when a predetermined trigger event is detected, transmits the input image input from the image acquisition unit 130 to the dictionary server 200 via the communication unit 114. The dictionary saver 200 is a server that holds a feature dictionary, which is a set of image feature quantities for a known object, as described above.

The trigger event that is a trigger for the transmission of the input image from the transmitting unit 140 can be one or more of the following events, for example:

a) Arrival of a periodic timing: the input image is transmitted once in n frames or once in t seconds. Such cycle is typically set in advance so that the frequency of the transmission of the input images is less than the frequency of object identification performed by the identification unit 170.

b) User instruction: the input image is transmitted in response to an explicit instruction from a user via the input unit 106.

c) Frame-out of an object being tracked: when an object identified as a result of object identification has moved out of the frame of the input image, the input image is transmitted.

d) Frame-in of a new object: when a new object is detected with the frame of the image as a result of object identification, the input image is transmitted. Examples of new objects can include a known object and an unknown object that have not existed in the image. A known object can be detected using a simple recognition technology such as face recognition, for example. For example, when a moving object is recognized from the difference between the current frame and the previous frame (the difference can be the one to which motion compensation is applied), and it is difficult to identify what kind of object the recognized moving object is, it may be determined that a new unknown object has entered the image (frame-in). Detection of a moving object based on such image difference can be performed only when no object is identified in the image by object identification, for example e) Movement of the terminal device when a change in the position or orientation of the terminal device 100, an increase in the speed thereof, or the like is detected, the input image is transmitted.

Periodic transmission of the input images can be adopted when it is desirable to continuously perform object identification independently of the content of the images. Transmission of the input image in response to a user instruction can be adopted when, for example, a user desires that an object displayed on the screen be identified or tracked. The other trigger evens am events that am based on the presumption that there is a high possibility that a new object is in the image; when the input image is transmitted in response to such trigger event and a feature dictionary is provided from the dictionary saver 200, it becomes possible to adequately identify anew object.

The transmitting unit 140 can also transmit to the dictionary server 200 assistance information for assisting in the acquisition of a feature dictionary by the dictionary server 200, together with the input image. Examples of the assistance information can include at least one of the position (of the terminal device 100 or the imaging device) or the date and time of when the input image was captured, and the capability information of the terminal device 100. The position and the date and time can be used in filtering a feature dictionary in the dictionary server 200. The capability information of the terminal device 100 can be used in determining the data volume of a feature dictionary to be provided to the terminal device 100 from the dictionary server 200. Utilization of such assistance information is described in further detail below.

e. Receiving Unit

The receiving unit 150, after the input image is transmitted from the transmitting unit 140 to the dictionary server 200, receives from the dictionary server 200 a feature dictionary acquired in the dictionary saver 200 in accordance with the result of identification of an object in the input image. The feature dictionary received by the receiving unit 150 is a dictionary with a less data volume than the feature dictionary of the dictionary saver 200. How the feature dictionary provided to the terminal device 100 is acquired in the dictionary server 200 is described in further detail below.

The receiving unit 150, upon receiving a feature dictionary, causes the dictionary cache 160 to store the received feature dictionary. In this exemplary embodiment, each feature quantity included in the feature dictionary is associated with an identifier for uniquely identifying an object (hereinafter referred to as an "object ID"). If the receiving unit 150 has newly received a feature quantity with the same object ID as that of the feature quantity stored in the dictionary cache 160, the feature quantity in the dictionary cache 160 can be updated to the newly received feature quantity. In addition, the receiving unit 150 can add a reception time stamp to each feature quantity received, and automatically delete from the dictionary cache 160 a feature quantity that has been stored over a predetermined period of time since the addition of the reception time stamp. Alternatively, a feature quantity can be deleted from the dictionary cache 160 in accordance with, as a trigger, a specific amount of a movement of the terminal device 100 or a frame-out movement of the associated object going out of the image.

Further, in this exemplary embodiment, the receiving unit 150 receives from the dictionary server 200 an additive information database acquired in the dictionary server 200 in accordance with the result of objet identification. The additive information database received by the receiving unit 150 is a database with a less data volume than the additive information database stored in the dictionary saver 200 in advance. The receiving unit ISO causes the additive information cache 180 to sore the received additive information database.

f. Dictionary Cache

The dictionary cache 160 stores a feature dictionary received by the receiving unit 150, using the storage unit 108 shown in FIG. 3. The feature dictionary stored in the dictionary cache 160 is referred to when object identification is performed by the identification unit 170.

g. Identification Unit

The identification unit 170 extracts the feature quantity of an input image input from the image acquisition unit 130, and checks the extracted feature quantity against the feature dictionary stored in the dictionary cache 160, thereby identifying an object in the input image. A feature extraction algorithm used by the identification unit 170 can be, for example, Random Ferns described in the aforementioned document or SURF described in "SURF: Speeded Up Robust Features" by Bay et al. (See Bay et at. Computer Vision and Image Understanding (CVIU), Vol. 110, No. 3, pp. 346-359, 2006). Such algorithms are "lightweight" algorithms that can operate at fast speed with a lower processing cost. As a result of object identification performed by the identification unit 170, the object ID of an object in the input image, and the position and attitude of the object in the input image are derived. Then, the identification unit 170 outputs the result of object identification to the display control unit 190.

h. Additive Information Cache

The additive information cache 180 stores an additive information database received by the receiving unit 150, using the storage unit 108 shown in FIG. 3. The display control unit 190 described next selects additive information to be overlaid on the input image from the additive information database stored in the additive information cache 180.

g. Display Control Unit

The display control unit 190 acquires additive information associated with the object identified by the identification unit 170 from the additive information database stored in the additive information cache 180, and overlays the acquired additive information on the input image thereby generating an output image. Then, the display control unit 190 outputs the generated output image to the display unit 112.

Figure 5:
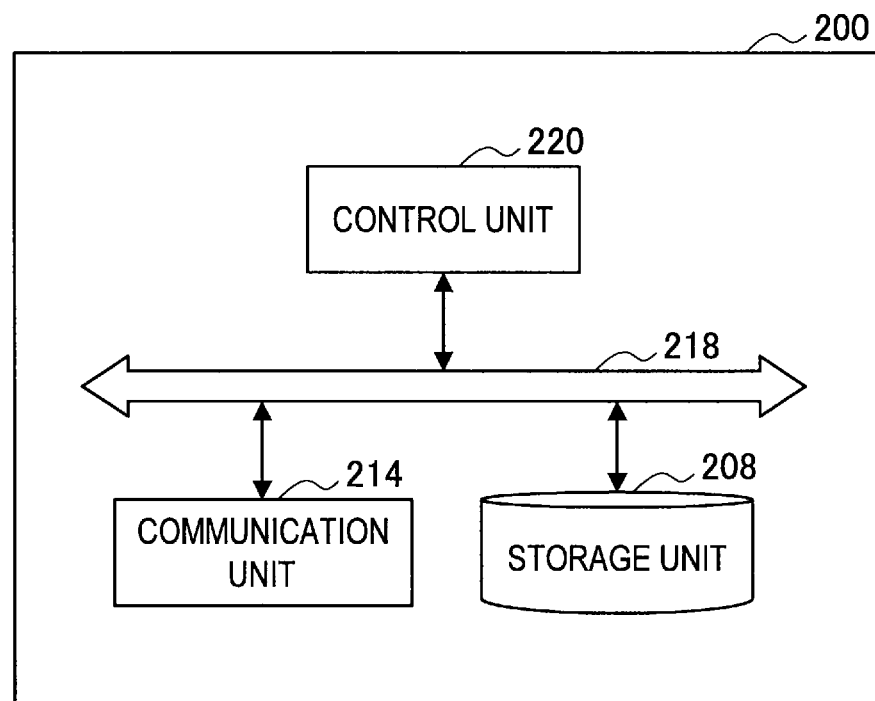
FIG. 5 is a block diagram showing an exemplary hardware configuration of a dictionary server in accordance with an embodiment.

The additive information overlaid on the input image can be any information. For example, the additive information overlaid on the input image can be advertising information rating information, and the like associated with a building in the input image as exemplarily shown in IG 2. Other examples of the additive information are described in further detail below 3. Exemplary Configuration of the Dictionary Server in accordance with an Exemplary Embodiment 3-1. Hardware Configuration FIG. 5 is a block diagram showing an exemplary hardware configuration of the dictionary server 200 in accordance with this exemplary embodiment. Referring to FIG. 5, the dictionary server 200 includes a tangible, non-transitory computer-readable medium, an example of which is storage unit 208, a communication unit 214, a bus 218, and a control unit 220.

a. Storage Unit

The storage unit 208 includes a tangible, non-transitory storage medium, such as semiconductor memory or a hard disk, and stores programs and data to be for processes performed by the dictionary server 200. The storage unit 208 can have a higher storage capacity than the storage unit 108 of the terminal device 100. The storage unit 208 stores in advance a feature dictionary and an additive information database described below.

b. Communication Unit

The communication unit 214 is a communication interface that mediates the communication between the dictionary server 200 and the terminal device 100. The communication unit 214 supports a given radio communication protocol or wire communication protocol, and establishes a communication connection with the terminal device 100. Accordingly, it becomes possible for the dictionary server 200 to receive an image from the terminal device 100 and to transmit a feature dictionary and an additive information database to the terminal device 100.

c. Bus

The bus 218 mutually connects the storage unit 208, the communication unit 214 and the control unit 220.

d. Control Unit

The control unit 220 corresponds to a processor such as a CPU or a DSP. The control unit 220 can have higher operation performance than the control unit 120 of the terminal device 100. The control unit 220 causes a variety of functions of the dictionary server 200 described below to operate by executing the programs stored in the storage unit 208 or another storage medium.

3-2. Logical Configuration

FIG. 6 is a block diagram showing an exemplary configuration of the logical function implemented by the storage unit 208 and the control unit 220 of the dictionary server 200 shown in FIG. 5. Referring to FIG. 6, the dictionary server 200 includes a receiving unit 230, a feature dictionary 240 for a first algorithm (Arg 1), a feature dictionary 242 for a second algorithm (Arg 2), an identification unit 250, a dictionary acquisition unit 260, an additive information database (DB) 270, an additive information acquisition unit 280, and a transmitting unit 290.

a. Receiving Unit

The receiving unit 230 waits for an input image transmitted from the terminal device 100. The receiving unit 230, upon receiving an input image via the communication unit 214, outputs the received input image to the identification unit 250. In addition, the receiving unit 230, upon receiving the aforementioned assistance information together with the input image outputs the assistance information to the identification unit 250 and the dictionary acquisition unit 260.

b. Feature Dictionary

Each of the feature dictionary (Arg 1) 240 and the feature dictionary (Arg 2) 242 is a set of feature quantities stored in the storage unit 208 in advance. Each feature quantity in the feature dictionary (Arg 1) 240 is extracted from a known object image in accordance with a first algorithm. Likewise, each feature quantity in the feature dictionary (Arg 2) 242 is extracted from the known object image in accordance with a second algorithm. Typically, the first algorithm is a feature extraction algorithm that enables object identification with higher accuracy than the second algorithm. Meanwhile, the second algorithm is a feature extraction algorithm that can be executed at faster speed than the first algorithm. The first algorithm can be, for example, the feature extraction algorithm described in JP 4492036B above. Alternatively, the first algorithm may be an algorithm described in, for example, "Shape Matching and Object Recognition Using Shape Contexts" by Belongie et al. (See Belongie et al., IEEE Trans. Patten Analysis and Machine Intelligence, Vol.

2, No. 4, pp. 509-522, April 2002), or an algorithm described in "Distinctive image features from scale-invariant keypoints" by Lowe (See Lowe, Internal Journal of Computer Vision, 60, 2, pp. 91-110, January 2004). The second algorithm may a feature extraction algorithm (e.g., Random Fens or SURF) that is also used for object identification performed by the identification unit 170 of the terminal device 100 described above. In the following description, the first algorithm will be referred to as a high-accuracy algorithm and the second algorithm will be referred to as a "lightweight" algorithm.

A feature quantity in the feature dictionary (Arg 1) 240 and a feature quantity in the feature dictionary (Arg 2) 242 are linked together using a common object ID. That is, a feature quantity for an identical object ID is included in both the feature dictionary (Arg 1) 240 and the feature dictionary (Arg 2) 242.

FIG. 7 is an explanatory diagram illustrating an exemplary feature dictionary stored in the dictionary server 200. Referring to FIG. 7, the feature dictionary (Arg 1) 240 includes a feature quantity for each of a plurality of objects including eight objects $B_1$ to $B_2$ extracted from known object images in accordance with a high-accuracy algorithm. Each object is assigned a name. Likewise, the feature dictionary (Arg 2) 242 includes a feature quantity for each of the plurality of objects including eight objects $B_1$ to $B_8$, extracted in accordance with a "lightweight" algorithm. The object ID of each object is common to the two feature dictionaries. That is, the feature quantity for the object $B_1$ in the feature dictionary 242 is the same as the feature quantity for the object $B_1$ in the feature dictionary 240, namely, a feature quantity extracted from an image of a building A.

The feature dictionaries 240 and 242 are not limited to the examples shown in FIG. 7, and can include additional data. In some of the examples described below, the feature dictionary 240 includes additional data for assisting in the efficient acquisition of a feature dictionary to be provided to the terminal device 100. Note that instead of (or in addition to) the feature dictionary 240, the feature dictionary 242 can include such additional data.

c. Identification Unit

The identification unit 250 extracts the feature quantity of an input image received by the receiving unit 230 in accordance with a high-accuracy algorithm, and checks the extracted feature quantity against the feature dictionary (Arg 1) 240, thereby identifying one or more objects in the input image. Then, the identification unit 250 outputs the object ID and the checked score of the identified object(s) to the dictionary acquisition unit 260 and the additive information acquisition unit 280.

d. Dictionary Acquisition Unit

The dictionary acquisition unit 260 acquires a feature dictionary to be provided to the terminal device 100 in accordance with the result of identification performed by the identification unit 250. The feature dictionary acquired by the dictionary acquisition unit 260 is a subset of the feature dictionary (Arg 2) 242 that has a less data volume than the feature dictionary (Arg 1) 240 and the feature dictionary (Arg 2) 242 described above. Hereinafter, four examples of the acquisition of a dictionary subset by the dictionary acquisition unit 260 will be described with reference to FIGS. 8 to 11.

(1) First Example

FIG. 8 is an explanatory diagram illustrating a first example of a dictionary subset acquired by the dictionary acquisition unit 260. Referring to FIG. 8, the rank of a checked score, which is obtained as a result of identification performed by the identification unit 250, is shown for each object ID in the feature dictionary (Arg 1) 240. In the example of FIG. 8, the checked score of the object B is the highest and ranks first. The checked score of the object $B_2$ is the second highest and ranks second. The checked score of the object $B_6$ ranks k-th. The dictionary acquisition unit 260 acquires from the feature dictionary (Arg 2) 242 the feature quantities for the objects associated with ranks that exceed a threshold value, for example, whose checked scores rank first to k-th. Thea, the dictionary acquisition unit 260 outputs, as a feature dictionary to be provided to the terminal device 100, a subset 242a of a feature dictionary including the acquired feature quantities to the transmitting unit 290.

Note that the volume of data (e.g., the number k of feature quantities) to be included in the subset 242a of the feature dictionary can be dynamically determined in accordance with the capability information of the terminal device 100 received as the assistance information from the terminal device 100. Capability of the terminal device 100 can be expressed by, for example, the number of pieces of processable data, the number of cores of the processor, the memory capacity, or the like.

(2) Second Example

FIG. 9 is an explanatory diagram illustrating a second example of a dictionary subset acquired by the dictionary acquisition unit 260. In the second example, the feature dictionary (Arg 1) 240 has, in addition to the "object ID," "name," and "feature quantity" for each object, predefined data called "co-occurring object." The "co-occurring object" represents a list of objects that have a high possibility of co-occurring with each object. In this specification, a state in which a second object exists near a first object is rephrased as: the first object and the second object "co-occur," In the example of FIG. 9, co-occurring objects of the object $B_4$ are the object $B_5$ and the object $B_9$. This means that when an input image is identified as including the object % (a traffic light D), it is highly probable that the object $B_5$ (a vehicle E) or the object $B_9$ (a md sign) appear in the following input image. Using such data, the dictionary acquisition unit 260 can acquire not only the feature quantity for an object that is already in the input image but also the feature quantity for an object that is predicted to appear in the following input image. In the example of FIG. 9, the dictionary acquisition unit 260 acquires, in addition to the feature quantity for the object B& whose checked score ranks high, the feature quantities for the objects $B_5$ and $B_9$ that are predicted to appear in the following input image from the feature dictionary (Arg 2) 242. Then, the dictionary acquisition unit 260 outputs a subset 242b of a feature dictionary including the acquired feature quantities to the transmitting unit 290.

(3) Third Example

FIG. 10 is an explanatory diagram illustrating a third example of a dictionary subset acquired by the dictionary acquisition unit 260. In the third example also, the dictionary acquisition unit 260 acquires not only the feature quantity for an object that is already in the input image but also the feature quantity for an object that is predicted to appear in the following input image. In the third example, the object that is predicted to appear in the following input image is an object that is determined, from positional data, to be located near the object that is already in the input image. Referring to FIG. 10, the feature dictionary (Arg 1) 240 has positional data (latitude and longitude, or other coordinate data) for each object. For example, the position of the object $B_1$ is $X_1$, the position of the object $B_2$ is $X_2$, and the position of the object $B_3$ is $X_3$. Among them, the distance between the position $X_1$ and the position $X_2$ is less than a threshold value, e.g., threshold D. The dictionary acquisition unit 260, when the checked score of the object $B_1$ ranks high, acquires not only the feature quantity for the object $B_1$ but also the feature quantity for the object $B_2$ located near the object $B_1$ from the feature dictionary (Arg 2) 242 on the basis of the positional data. Then, the dictionary acquisition unit 260 outputs a subset 242c of a feature dictionary including the acquired feature quantities to the transmitting unit 290.

Note that the positional data exemplarily shown in FIG. 10 can also be used for filtering the feature dictionary. For example, the dictionary acquisition unit 260 can acquire only the feature quantity for an object located near the terminal device 100 among objects whose checked scores rank first to k-th. Alternatively, the identification unit 250 can use only the feature quantity for an object located near the terminal device 100 as the target to be checked against the feature quantity extracted from the input image. The position of the terminal device 100 can be recognized from the assistance information received from the terminal device 100.

The exemplary processes described above are not limited to the identification of objects included within the feature dictionary and disposed within a threshold distance of an identified object, e.g., object $B_1$. For example, as depicted in FIG. 10, dictionary acquisition unit 260 may identify object $B_1$ associated with "Building A," determine that the checked score of the object $B_1$ ranks high, and subsequently output object $B_1$ as a portion of the subset 242c. In additional embodiments, dictionary acquisition unit 260 may obtain information associated with additional objects of potential relevance to object $B_1$, or that are related to object $B_1$. The obtained information may include, but is not limited to, feature quantities of the additional objects, object identifiers associated with the additional objects, and positional data associated with the additional objects. For example, such additional objects may be landmarks near object $B_1$, buildings related to occupants of Building A, infrastructure elements disposed near object $B_1$ and any additional or alternate object related to object $B_1$ as would be apparent to one of skill in the art.

In such an embodiment, dictionary acquisition unit 260 may select one or more of the additional objects for inclusion within subset 242c, and may output information associated with the additional objects (e.g., feature quantities and object identifiers) to transmitting unit 290. Additionally or alternatively, dictionary acquisition unit 260 may determine whether geographic positions of the additional objects fall within the threshold distance of object $B_1$, and may subsequently incorporate, into subset 242c, one or more of the additional elements that are disposed within the threshold distance of object $B_1$.

In such embodiments, dictionary acquisition unit 260 may obtain feature identifiers associated with the additional objects from the obtained information, as outlined above. In additional embodiments, dictionary acquisition unit 260 may initially determine whether information associated with the additional objects is included within the feature dictionary. Dictionary acquisition unit 260 may subsequently rely on the obtained information with the feature dictionary does not include the additional objects. In such an embodiment, dictionary acquisition unit 260 may update the feature dictionary to include the information associated with one or more of the additional objects.

(4) Fourth Example

Figure 11:
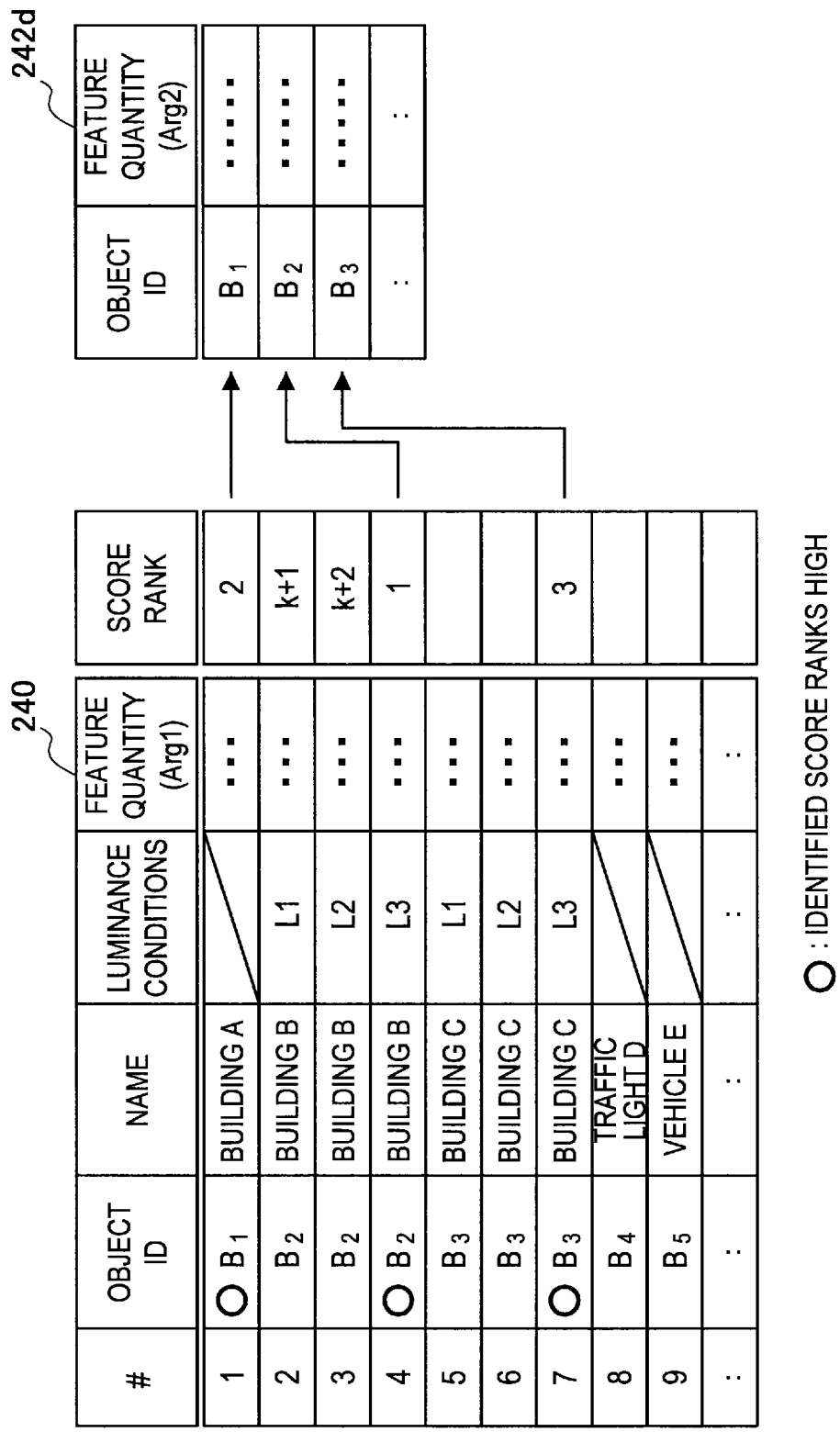
FIG. 11 is an explanatory diagram illustrating a fourth example of a dictionary subset acquired by a dictionary saver, in accordance with an exemplary embodiment.

FIG. 11 is an explanatory diagram illustrating a fourth example of a dictionary subset acquired by the dictionary acquisition unit 260. Referring to FIG. 11, the feature dictionary (Arg 1) 240 has, in addition to the "object ID," "name," and "fate quantity" for each object, data called "luminance conditions." The "luminance conditions" can be a classification indicating the luminance conditions of when a known object image was captured. The luminance conditions are distinguished from each other in accordance with the time-related conditions, i.e., a time period or season of when an image was captured, or the weather-related conditions. The feature dictionary (Arg 1) 240 can include a plurality of types of feature quantities extracted from images that have bow obtained by capturing an identical object under different luminance conditions. In the example of FIG. 11, for the object $B_2$, a feature quantity corresponding to a luminance condition L1 (e.g., "morning" or"sunny"), a feature quantity corresponding to a luminance condition L2 (e.g., "daytime" or "cloudy"), and a feature quantity corresponding to a luminance condition L3 (e.g., "late afternoon" or "rainy") are included in the feature dictionary (Arg 1) 240. Likewise, for the object $B_3$, feature quantities corresponding to the luminance conditions L1, L2, and 13 arm also included in the feature dictionary (Arg 1) 240. As described above, when a plurality of feature quantities for an identical object captured under different luminance conditions are included in the feature dictionary (Arg 1) 240, object identification performed by the identification unit 250 will be less susceptible to the influence of the difference in the way in which an object looks different due to the difference in luminance conditions. In the example of FIG. 11, when an input image including the object $B_2$ is received, for example, a score obtained by checking the feature quantity of the input image against the feature quantity corresponding to each of the luminance conditions L1 and L2 is low, but a score obtained by checking the feature quantity of the input image against the feature quantity corresponding to the luminance condition L3 is high. Thus the feature quantity for the object $B_2$ is appropriately included in a subset 242d of a feature dictionary.

Note that the luminance condition data exemplarily shown in FIG. 11 can also be used for filtering the feature dictionary. For example, the dictionary acquisition unit 260 can exclude from the subset 242d of feature quantities a feature quantity corresponding to a luminance condition that is different from the luminance condition to which the date and time of when the input image was captured belong among the feature quantities of objects whose checked scores rank first to k-th. Alternatively, the identification unit 250 can use only a feature quantity corresponding to the luminance condition to which the date and time of when the input image was captured belong as the target to be checked against the feature quantity extracted from the input image. The date and time of when the input image was captured can be recognized from the assistance information received from the terminal device 100.

e. Additive Information IB

The additive information DB 270 is a sat of additive information associated with objects existing in the real space. In the field of AR, additive information is also referred to as "annotation" FIG. 12 is an explanatory diagram illustrating exemplary data stored in the additive information DB. Referring to FIG. 12, in the additive information DB 270, additive information including two data items: "type" and "content" are associated with the object ID of each object. The "type" refers to the type of individual additive information. The "content" can be text data, graphic data, image data, or the like as the entity of the individual additive information. In the example of FIG. 12, advertising information and rating information are associated with the object Br. In addition, advertising information, attention-seeking information, and vehicle type information are associated with the objects $B_2$, $B_4$, and $B_5$, respectively.

f. Additive Information Acquisition (Hit

The additive information acquisition unit 280 acquires from the additive information DB 270 additive information to be provided to the terminal device 100 in accordance with the result of identification performed by the identification unit 250, and generates a subset of an additive information database with a les data volume. Then, the additive information acquisition unit 280 outputs the generated subset of the additive information database to the transmitting unit 290. The additive information acquisition unit 280 typically acquires from the additive information DB 270 a set of additive information including object IDs that are common to those of the subset of the feature dictionary acquired by the dictionary acquisition unit 260. That is, the additive information acquisition unit 280 can also acquire from the additive information DB 270 a set of additive information corresponding to the objects whose checked scores rank first to k-th. Further the additive information acquisition unit 280 can also acquire from the additive information DB 270 additive information corresponding to an object that is predicted to appear in the following input image.

g. Transmitting Unit

The tansmitting unit 290 transmits the subset of the feature dictionary acquired by the dictionary acquisition unit 260 to the terminal device 100 via the communication unit 214. In that case, the transmitting unit 290 can determine if the identified object includes a new object that is different from the objects identified in the past and can, only when a new object is identified, transmit to the terminal device 100 a subset of a feature dictionary for the new object. Accordingly, when an identical object continuously appears in the input images, redundant transmission of feature dictionaries is omitted, whereby the traffic load is reduced. In addition, the transmitting unit 290 transmits to the terminal device 100 a subset of the additive information database generated by the additive information acquisition unit 280. The subset of the additive information database can also be transmitted only when a new object is identified.

3-3. Variation

Next, two variations of the dictionary server 200 will be described.

a. First Variation

Figure 13:
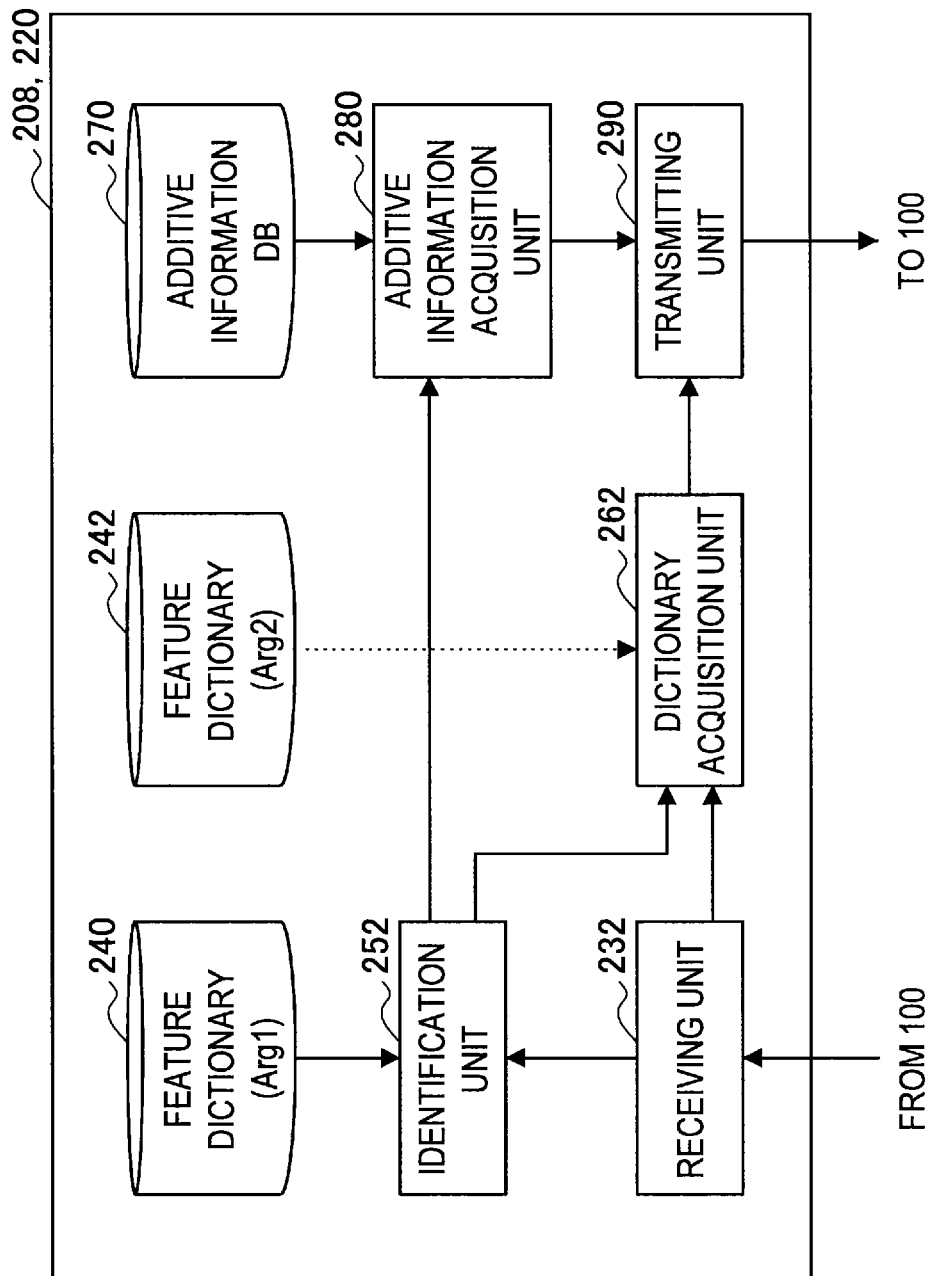
FIG. 13 is a block diagram showing an exemplary configuration of the logical function of a dictionary saver in accordance with a first variation in accordance with an exemplary embodiment.

FIG. 13 is a block diagram showing an exemplary configuration of the logical function of the dictionary server 200 in accordance with a first variation. Referring to FIG. 13, the dictionary server 200 includes a receiving unit 232, a feature dictionary 240 for a high-accuracy algorithm (Arg 1), a feature dictionary 242 for a "lightweight" algorithm (Arg 2), an identification unit 252, a dictionary acquisition unit 262, an additive information DB 270, an additive information acquisition unit 280, and a transmitting unit 290.

The receiving unit 232 waits for an input image transmitted from the terminal device 100. The receiving unit 232, upon receiving an input image via the communication unit 214, outputs the received input image to the identification unit 252 and the dictionary acquisition unit 262.

The identification unit 252 extracts the feature quantity of the input image received by the receiving unit 232 in accordance with a high-accuracy algorithm, and checks the extracted feature quantity against the feature dictionary (Arg 1) 240, thereby identifying one or more objects in the input image. In addition, the identification unit 252 identifies the position and attitude of the object(s) in the input image. Then, the identification unit 252 outputs the object ID, position, and attitude of the identified object(s) to the dictionary acquisition unit 262. In addition, the identification unit 252 outputs the object ID of the identified object(s) to the additive information acquisition unit 280.

The dictionary acquisition unit 262 acquires a feature dictionary to be provided to the terminal device 100 in accordance with the result of identification performed by the identification unit 252. More specifically, the dictionary acquisition unit 262 first recognizes the position of the object identified by the identification unit 252 in the input image, and cuts a partial image of an area including the object out of the input image. Then, the dictionary acquisition unit 262 extracts a feature quantity from the cut-out partial image in accordance with a "lightweight" algorithm. The dictionary acquisition unit 262 associates the object ID input from the identification unit 252 with the thus extracted feature quantity of each object, and generates a feature dictionary for the "lightweight" algorithm. In this case, the feature dictionary 242 for the "lightweight" algorithm (Arg 2) can be omitted from the configuration of the dictionary server 200. Instead, the dictionary acquisition unit 262 can generate a new feature dictionary by adding the feature quantity extracted from the partial image (e.g., additionally learned feature quantity) to a subset of feature quantities acquired from the feature dictionary 242. The dictionary acquisition unit 262 outputs the thus generated feature quantity dictionary to the transmitting unit 290, and causes the feature dictionary to be transmitted from the transmitting unit 290 to the terminal device 100.

Further, the dictionary acquisition unit 262 can generate variations of the feature quantity extracted in accordance with the "lightweight" algorithm by varying a parameter such as the color, luminance, or the degree of blur of the feature quantity. Such variations of the feature quantity can also form a new feature dictionary.

Figure 14:
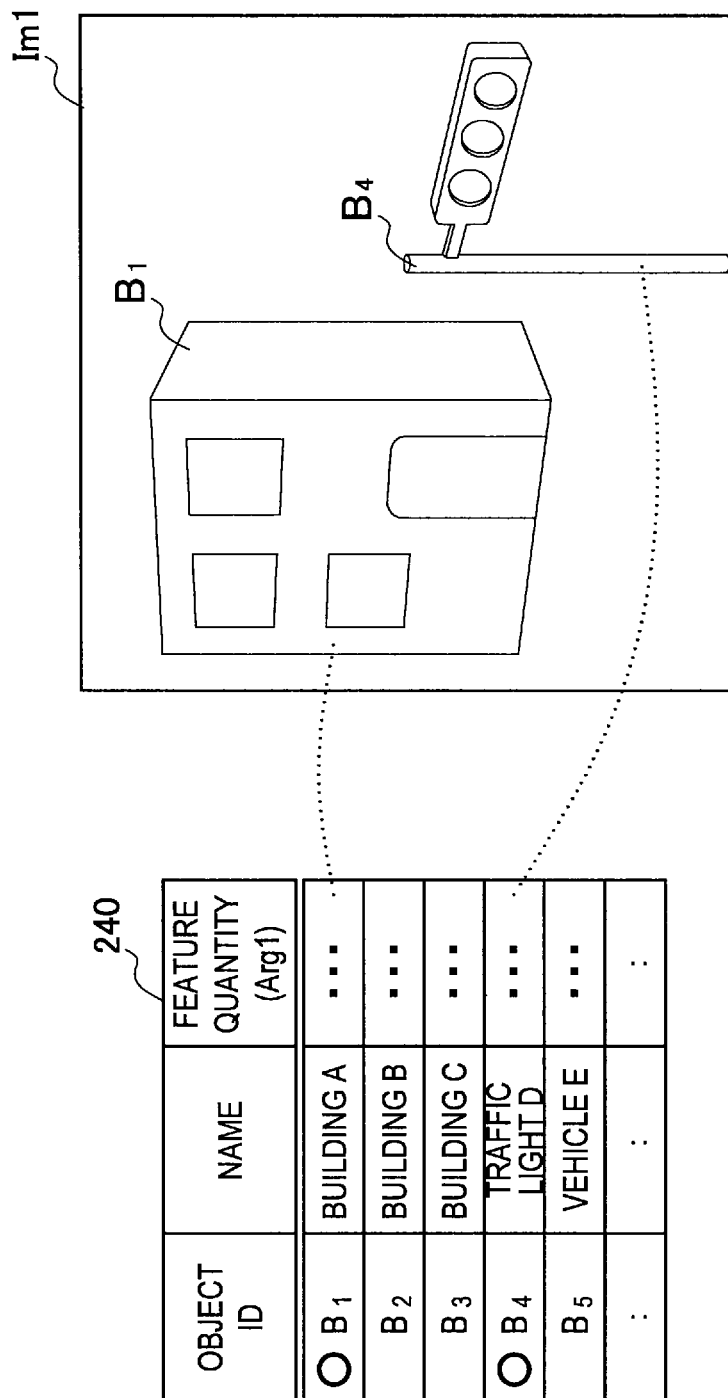
FIG. 14 is a first explanatory diagram illustrating the generation of a feature dictionary in accordance with the first variation, in accordance with an exemplary embodiment.
Figure 15:
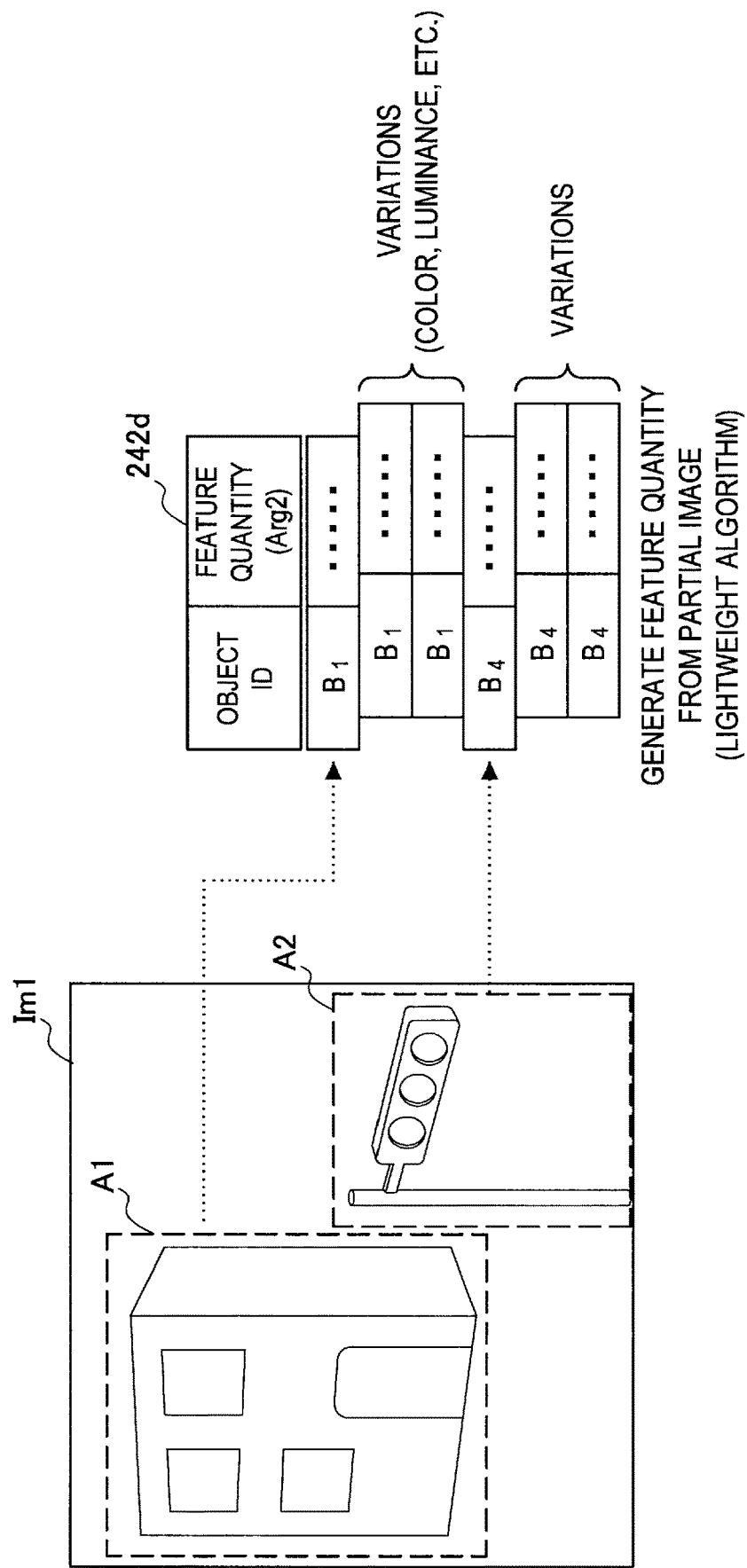
FIG. 15 is a second explanatory diagram illustrating the generation of a feature dictionary in accordance with the first variation, in accordance with an exemplary embodiment.

FIGS. 14 and 15 are explanatory diagrams each illustrating the generation of a feature dictionary with the dictionary acquisition unit 262 in accordance with the first variation. Referring to FIG. 14, objects $B_e$ and $B_1$ in an input image Im1 are identified using the feature dictionary 240 and a high-accuracy algorithm. Then, as shown in FIG. 15, the dictionary acquisition unit 262 cuts a partial image A1 including the object $B_1$ and a partial image A2 including the object $B_4$ out of the input image Im1. Then, the dictionary acquisition unit 262 extracts a feature quantity from each of the partial image A1 and the partial image A2 in accordance with a "lightweight" algorithm. In addition, the dictionary acquisition unit 262 generates variations of the extracted feature quantity by varying a parameter such as the color or luminance of the feature quantity. Further, the dictionary acquisition unit 262 forms a new feature dictionary 242d to be provided to the terminal device 100 by adding an object ID to each feature quantity.

According to the first variation, a feature dictionary that is dynamically generated from the input image by the dictionary saver 200 is provided to the terminal device 100. Such a feature dictionary is a feature dictionary with a less data volume, including feature quantities that are particularly adapted to the environment (e.g., imaging environment or luminance environment) in which the terminal device 100 is located. Therefore, the terminal device 100 can identify an object in the input image as well as the position and attitude of the object with high accuracy and a low processing cost.

b. Second Variation

In the aforementioned example, a subset of a feature dictionary for a "lightweight" algorithm is provided to the terminal device 100 from the dictionary saver 200. However, as in a second variation described below, the dictionary server 200 can provide a subset of a feature dictionary for a high-accuracy algorithm to the terminal device 100.

Figure 16:
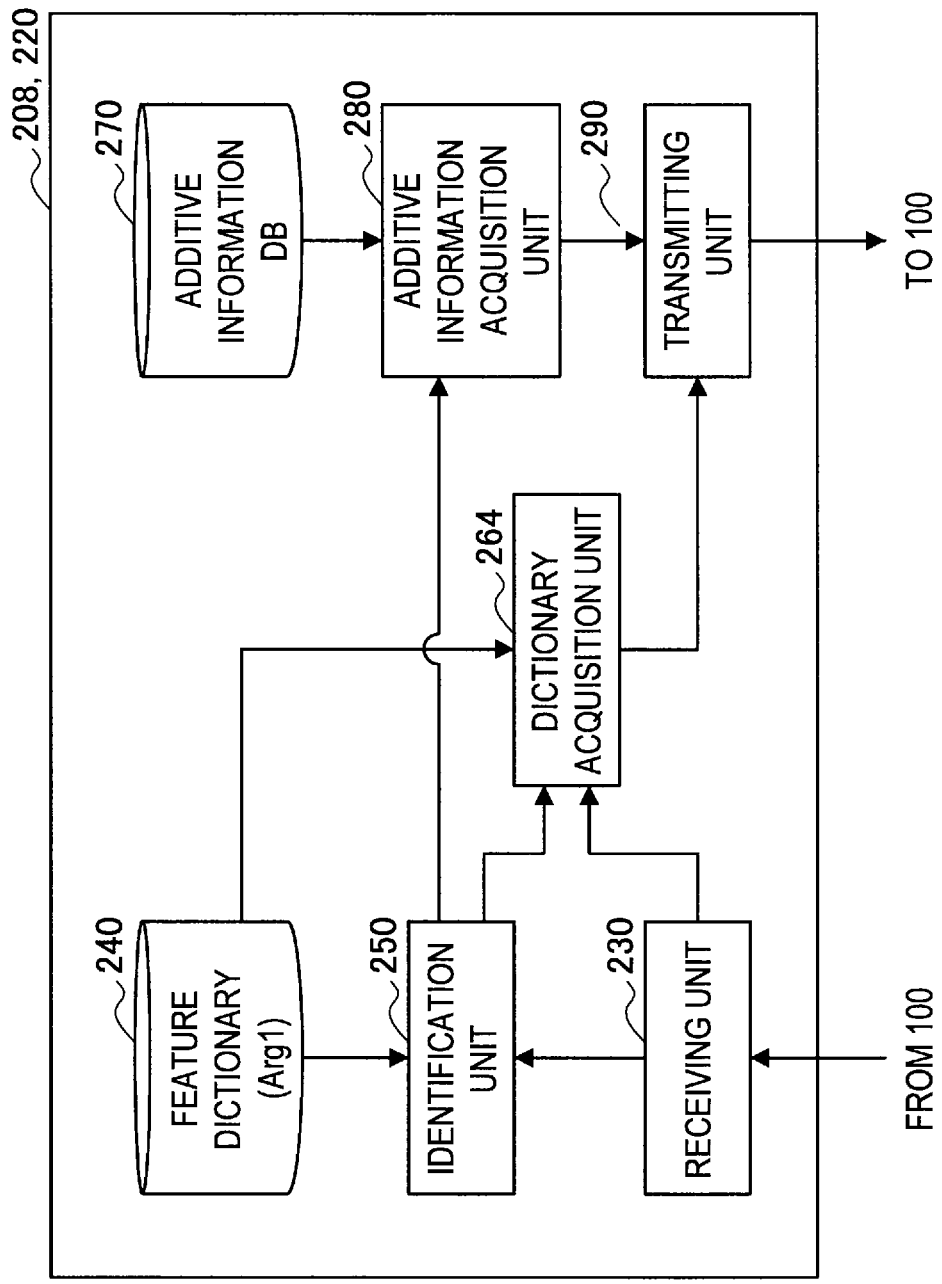
FIG. 16 is a block diagram showing an exemplary configuration of the logical function of a dictionary server in accordance with a second variation, in accordance with an exemplary embodiment.

FIG. 16 is a block diagram showing an exemplary configuration of the logical function of the dictionary saver 200 in accordance with the second variation. Referring to FIG. 16, the dictionary server 200 includes a receiving unit 230, a feature dictionary 240 for a high-accuracy algorithm (Arg1), an identification unit 250, a dictionary acquisition unit 264, an additive information DB 270, an additive information acquisition unit 280, and a transmitting unit 290.

Figure 17:
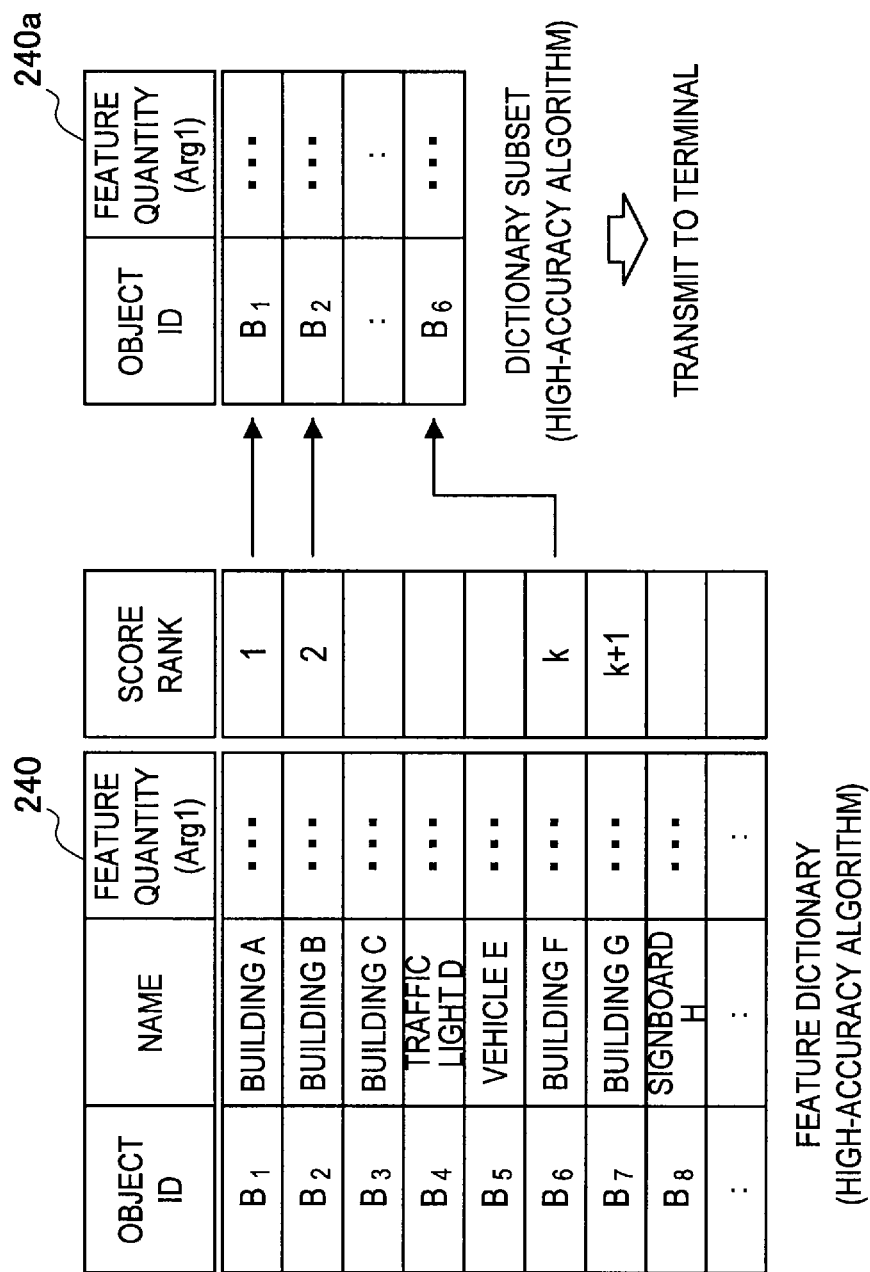
FIG. 17 is an explanatory diagram illustrating an example of a dictionary subset acquired in the second variation, in accordance with an exemplary embodiment.

The dictionary acquisition unit 264 acquires from the feature dictionary (Arg 1) 240 a subset of a feature dictionary to be provided to the terminal device 100 in accordance with the result of identification performed by the identification unit 250. For example, FIG. 17 again shows the ranks of checked scores obtained as a result of identification performed by the identification unit 250, in the example of FIG. 17, the checked score of the object $B_1$ ranks first, the checked score of the object $B_2$ ranks second, and the checked score of the object $B_6$ ranks k-th. The dictionary acquisition unit 264 acquires from the feature dictionary (Arg 1) 240 the feature quantities for the objects whose checked scores rank first to k-th, for example, and forms a subset 240a of a feature dictionary including the acquired feature quantities. Then, the transmitting unit 290 transmits the subset 240a of the feature dictionary to the terminal device 100.

When the second variation is adopted, the identification unit 170 of the terminal device 100 extracts a feature quantity from the input image in accordance with a high-accuracy algorithm, and checks the extracted feature quantity against a subset of a feature dictionary provided from the dictionary server 200. In this case, in comparison with an example in which a "lightweight" algorithm is used, the processing cost of the terminal device 100 needed for extraction of feature quantities is higher. However, the dictionary cache 160 stores not the entire feature dictionary of the dictionary saver 200 but only a subset of the feature dictionary. Therefore, in comparison with a case in which the terminal device 100 has the entire feature dictionary, the processing cost for checking feature quantities in the terminal device 100 and the consumed memory resources can be significantly lower.

Heretofore, an example in which the transmitting unit 140 of the terminal device 100 transmits an input image to the dictionary saver 200 has been mainly described. However, the transmitting unit 140 of the terminal device 100 can, instead of transmitting an input image, transmit to the dictionary server 200 a feature quantity extracted from the input image by the identification unit 170. In that case, the identification unit 250 of the dictionary server 200 can check the feature quantity of the input image received by the receiving unit 230 against the feature dictionary (Arg 1) 240.

4. Process Flow in Accordance with an Exemplary Embodiment 4-1. Processes on the Terminal Side FIG. 18 is a flowchart showing an exemplary flow of processes performed by the terminal device 100 in accordance with this exemplary embodiment.

Figure 18:
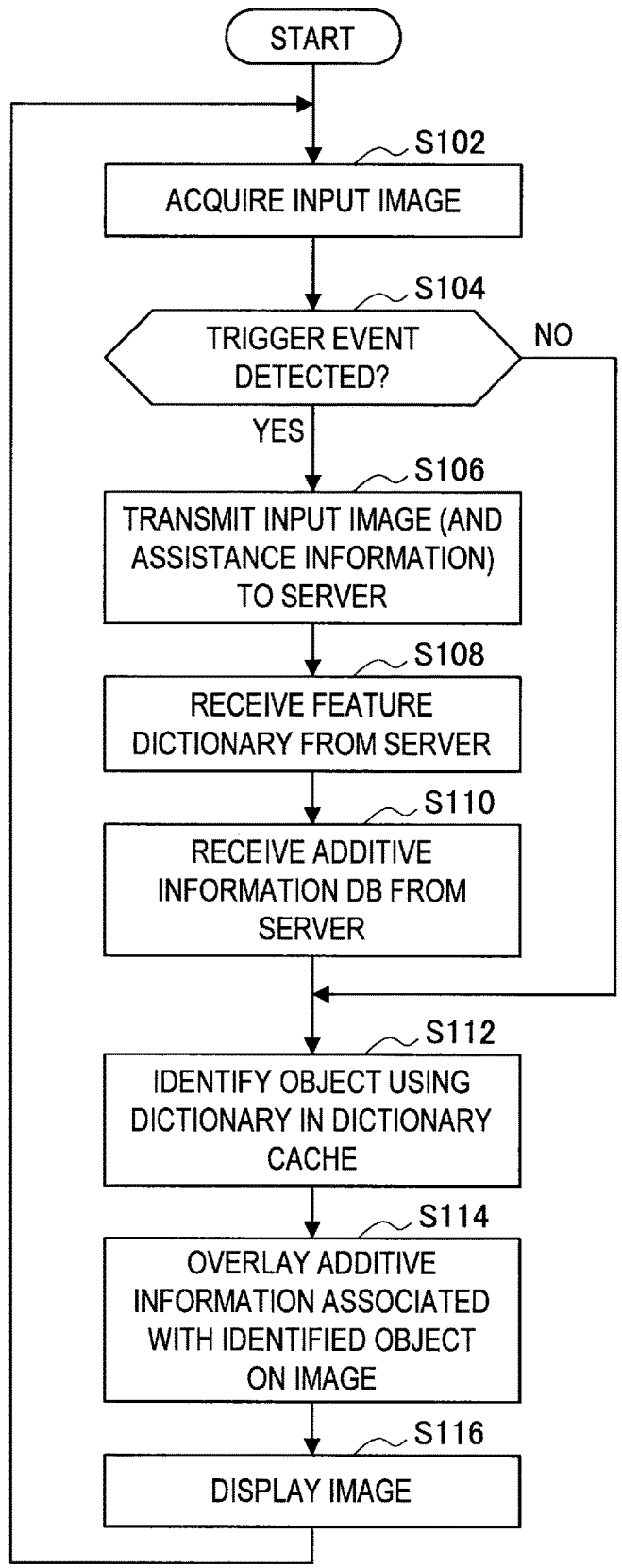
FIG. 18 is a flowchart showing an exemplary flow of processes performed by a terminal device in accordance with an exemplary embodiment.

Referring to FIG. 18, first, the image acquisition unit 130 of the terminal device 100 acquires an input image (step S102). Next, the transmitting unit 140 determine if a predetermined trigger event described above (e.g., arrival of a periodic timing or user instruction) has been detected (step S104). Herein, if a trigger event has not been detected, the processes of the following steps S106 to S110 are skipped. Meanwhile, if a trigger event has been detected, the transmitting unit 140 transmits the input image (and assistance information if necessary) to the dictionary server 200 (step S106). Then, the receiving unit 150 receives a feature dictionary from the dictionary server 200 (step S108). The feature dictionary received herein is stored in the dictionary cache 160. In addition, the receiving unit 150 receives an additive information DB from the dictionary server 200 (step S110). The additive information DB received herein is stored in the additive information cache 180. Next, the identification unit 170 identifies an object in the input image using the feature dictionary in the dictionary cache 160 (step S112). Next, the display control unit 190 acquires from the additive information cache 180 additive information associated with the object identified by the identification unit 170, and overlays the acquired additive information on the input image, thereby generating an output image (step S114). The position and attitude of the additive information in the input image can be adjusted in accordance with the position and attitude of the object identified by the identification unit 170, for example. Then, the display control unit 190 causes the generated output image to be displayed on the display unit 112 (step S116).

Such processes are repeated for each of a series of input images acquired by the image acquisition unit 130.

4-2. Processes on the Server Side

Figure 19:
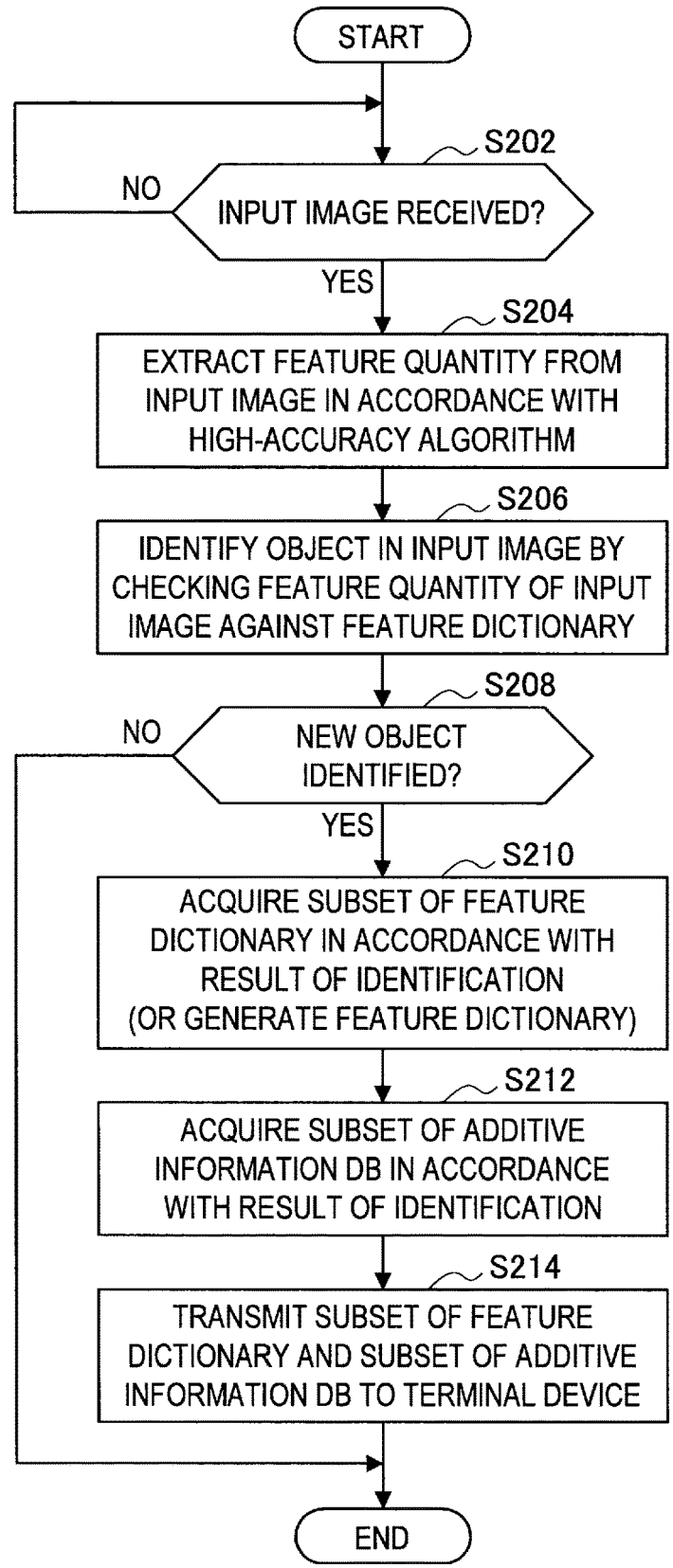
FIG. 19 is a flowchart showing an exemplary Dow of processes performed by a dictionary server in accordance with an exemplary embodiment.

FIG. 19 is a flowchart showing an exemplary flow of processes performed by the dictionary saver 200 in accordance with this exemplary embodiment.

Referring to FI 19, first, the receiving unit 230 of the dictionary server 200 waits for the reception of an input image from the terminal device 100 (step S202). Then, when an input image is received by the receiving unit 230, the identification unit 250 extracts a feature quantity from the put image in accordance with a high-accuracy algorithm (step S204). Next, the identification unit 250 checks the extracted feature quantity of the input image against each feature quantity in the feature dictionary (Arg 1) 240, and identifies an object in the input image (S206). Herein, if a new object that is different from the objects identified in the previously received input images is identified, the process proceeds to step S210 (S208). Meanwhile, if a new object is not identified, the processes of the following steps S210 to S214 can be skipped. If a new object is identified by the identification unit 250, a subset of a feature dictionary is acquired in accordance with the result of identification (or a new feature dictionary with a less data volume is generated) (step S210). Next, the additive information acquisition unit 280 acquires from the additive information DB 270 a subset of an additive information DB in accordance with the result of object identification performed by the identification unit 250 (step S212). Next, the transmitting unit 290 transmits the subset of the feature dictionary and the subset of the additive information DB to the terminal device 100 (steps S214).

The feature dictionary and the additive information DB, which are provided to the terminal device 100 from the dictionary server 200 through the aforementioned processes, are used for object identification in the terminal device 100.

5. Conclusion

An exemplary embodiment and two variations of the technology disclosed in this specification have been described above with reference to FIGS. 1 to 19. According to the aforementioned exemplary embodiment, a feature dictionary used for identification of an object in an input image by the terminal device 100 is provided with the terminal device 100 from the dictionary server 200 that stores a feature dictionary with more abundant feature quantities in advance. The feature dictionary provided to the terminal device 100 is a dictionary that is acquired in the dictionary server 200 in accordance with the result of identification of an object in the input image. Thus, even if the terminal device 100 with a small amount of processing resources does not have a feature dictionary with a large volume in advance, the terminal device 100 can identify an object with higher accuracy using a feature dictionary that is suitable for the conditions in which the terminal device 100 is located.

In addition, according to the aforementioned exemplary embodiment, an object can be identified using a high-accuracy feature extraction algorithm in the dictionary server 200, and the object can be identified using a "lightweight" feature extraction algorithm in the terminal device 100. Thus, even in the terminal device 100 with a small amount of processing resources, an application that involves object identification, for which real-time properties are required, such as an AR application can be operated with high accuracy at fast speed.

Further, according to the aforementioned exemplary embodiment, a database of additive information that can be overlaid on an image with an AR application is stored in the dictionary server 200 in advance, and a subset thereof is provided to the terminal device 100. Additive information provided to the terminal device 100 from the dictionary server 200 is also acquired in accordance with the result of identification of an object in the input image with the dictionary saver 200. Thus, resources used for storing and processing the additive information in the terminal device 100 can also be saved.

Furthermore, according to the aforementioned exemplary embodiment, a feature dictionary provided to the terminal device 100 from the dictionary server 200 includes not only the feature quantity for an object in the latest input image but also the feature quantity for an object that is predicted to appear in the following input image. Thus, in the terminal device 100, a feature dictionary that is once provided from the dictionary server 200 can be continuously used for a certain period of time. Accordingly, once a feature dictionary is provided, there will be no need thereafter to wait for the reception of data for object identification in the terminal device 100. Thus, the real-time properties of an application operating on the terminal device 100 can be improved. Further, as the terminal device 100 need not transmit an input image to the dictionary server 200 for each frame, the traffic load can also be reduced.

Moreover, according to the first variation, a new feature dictionary that is generated in the dictionary saver 200 using a partial image of an input image is provided to the terminal device 100. In this case, in comparison with a case in which a subset of a feature dictionary that is prepared in advance in a normal environment is provided, it becomes possible for the terminal device 100 to use a feature dictionary that is particularly adapted to the environment (e.g., imaging environment or luminance environment) in which the terminal device 100 is located Therefore, the processing cost for checking feature quantities in the terminal device 100 and the consumed memory resources can also be reduced in the second variation.

Note that the aforementioned object identification technique can be used not only for an AR application or applications having other objectives, but also for the initialization or calibration of a coordinate system in estimating the position and attitude of the terminal device 100 with the SLAM (Simultaneous Localization and Mapping) technology. For the SLAM technology, see "Real-Time Simultaneous Localization and Mapping with a Single Camera" by Davison (See Davison, Proceedings of the 9th IEEE International Conference on Computer Vision, Volume 2, 2003, pp. 1403-1410).

Although the disclosed exemplary embodiments have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the present technology can adopt the following configurations.

(1) A terminal device comprising:
  an mage acquisition unit that acquires a captured input image
  a transmitting unit that transmits the input image or a feature quantity of the input image to a server having a first feature dictionary, the first feature dictionary being adapted to be checked against the feature quantity of the input image to identify an object in the input image;
  a receiving unit that receives from the server a second feature dictionary acquired by the server in accordance with a result of object identification, the second feature dictionary having a less data volume than the first feature dictionary; and
  an identification unit that identifies an object in the input image by checking the feature quantity of the input image against the second feature dictionary received by the receiving unit.

(2) The terminal device according to the (1), further comprising a display control unit that overlays additive information on the input image, the additive information being associated with the object identified by the identification unit.

(3) The terminal device according to the (2), wherein
  the server includes a first additive information database that is a set of additive information associated with objects,
  the receiving unit further receives from the server a second additive information database acquired by the server in accordance with the result of object identification, the second additive information database having a less data volume than the first additive information database, and
  the display control unit overlays additive information on the input image, the overlaid additive information being associated with the object identified by the identification unit in the second additive information database.

(4) The terminal device according to the (1), wherein the transmitting unit periodically transmits the input image or the feature quantity of the input image to the server with less frequency than frequency of object identification performed by the identification unit.

(5) The terminal device according to the (1), wherein the transmitting unit transmits the input image or the feature quantity of the input image to the server when a predetermined event is detected.

(6) The terminal device according to the (5), wherein the predetermined event includes at least one of an instruction from a user movement of the terminal device, frame-out of an object being tracked and fame-in of a new object.

(7) The terminal device according to the (1), wherein the transmitting unit transmits assistance information together with the input image to the saver, the assistance information being adapted to assist in acquisition of the second feature dictionary by the server.

(8) The terminal device according to the (7), wherein the assistance information includes at least one of a position where the input image was captured, date and time when the input image was captured, and capability of the terminal device.

(9) The terminal device according to the (1), wherein the second feature dictionary includes feature quantities for one or more objects whose checked score(s) determined on the basis of the first feature dictionary rank(s) higher.

(10) The terminal device according to the (9), wherein the second feature dictionary further includes a feature quantity for an object that is predicted to appear in a following input image.

(11) The terminal device according to the (10), wherein the object that is predicted to appear in the following image includes an object located near an object identified on the basis of the first feature dictionary.

(12) The terminal device according to the (10), wherein the object that is predicted to appear in the following input image includes an object that has a high possibility of co-occurring with an object identified on the basis of the first feature dictionary.

(13) The terminal device according to the (1), wherein
the first feature dictionary includes a feature quantity extracted from an image in accordance with a first algorithm with higher ac y, and
the second feature dictionary includes a feature quantity extracted from an image in accordance with a second algorithm that can be executed at faster speed.

(14) Ile terminal device according to the (1), wherein the second feature dictionary includes a feature quantity extracted from an image in accordance with the same algorithm as that for the first feature dictionary.

(15). An information processing device comprising:
a storage unit that stores a first feature dictionary that is a set of feature quantities of known object images;
a receiving unit that receives an input image captured by a terminal device or a feature quantity of the input image;
an identification unit that identifies an object in the input image by checking the feature quantity of the input image against the first feature dictionary;
a dictionary acquisition unit that acquires a second feature dictionary in accordance with a result of identification performed by the identification unit, the second feature dictionary having a less data volume than the first feature dictionary; and
a transmitting unit that transmits the second feature dictionary acquired by the dictionary acquisition unit to the terminal device.

(16) The information processing device according to the (15), wherein
the storage unit further stores a third feature dictionary that is a set of feature quantities extracted from the known object images in accordance with an algorithm that is different from an algorithm for the first feature dictionary, and
the second feature dictionary is a subset of the third feature dictionary.

(17) The information processing device according to the (15), wherein the second feature dictionary is a subset of the first feature dictionary.

(18) The information processing device according to the (15), wherein
the receiving unit receives the input image from the terminal device, and
the second feature dictionary includes a feature quantity extracted from a partial image of the input image, the partial image including the object identified by the identification unit.

(19) The information processing device according to the (15), wherein the transmitting unit, when an object that is different from objects identified in the past is identified by the identification unit, transmits the second feature quantity to the terminal device.

(20) An object identifying method in a terminal device, comprising:
acquiring a captured input image;
transmitting the input image or a feature quantity of the input image to a saver having a first feature dictionary the first feature dictionary being adapted to be checked against the feature quantity of the input image to identify an object in the input image;
receiving from the server a second feature dictionary acquired by the server in accordance with a result of object identification, the second feature dictionary having a less data volume than the first feature dictionary; and
identifying an object in the input image by checking the feature quantity of the input image against the second feature dictionary.

(21) A program for causing a computer that controls a terminal device to function as:
an image acquisition unit that acquires a captured input image;
a transmitting unit that transmits the input image or a feature quantity of the input image to a saver having a first feature dictionary, the first feature dictionary being adapted to be checked against the feature quantity of the input image to identify an object in the input image;
a receiving unit that receives from the server a second feature dictionary acquired by the server in accordance with a result of object identification, the second feature dictionary having a less data volume than the first feature dictionary; and
an identification unit that identifies an object in the input image by checking the feature quantity of the input image against the second feature dictionary received by the receiving unit.

(22) An object identifying system comprising a server and a terminal device, wherein
the server includes
a storage unit that stores a first feature dictionary that is a set of feature quantities of known object images,
a receiving unit that receives an input image captured by the terminal device or a feature quantity of the input image, an identification unit that identifies an object in the input image by checking the feature quantity of the input image against the first feature dictionary, a dictionary acquisition unit that acquires a second feature dictionary in accordance with a result of identification performed by the identification unit, the second feature dictionary having a less data volume than the first feature dictionary, and a transmitting unit that transmits the second feature dictionary acquired by the dictionary acquisition unit to the terminal device, and the terminal device includes an image acquisition unit that acquires the input image, a transmitting unit that transmits the input image or the feature quantity of the input image to the server, a receiving unit that receives the second feature dictionary from the server, and an identification unit that identifies an object in the input image by checking the feature quantity of the input image against the second feature dictionary.

What is claimed is:

1. A device comprising:
an image sensor;
at least one sensor configured to detect a position and an attitude of the device; and
circuitry configured to:
acquire a first image by the image sensor;
transmit a first information including the position and the attitude of the device and the first image based on detection of a predetermined trigger event;
receive, based on the transmission of the first information and the first image, a second information including image feature quantities; and
control a display to display an augmented reality (AR) content based on an object which is identified by matching the image feature quantities and a second image which is acquired after the first image,
wherein the predetermined trigger event includes detecting movement of an object out of a frame of the first image or movement of the object into a current frame of the first image.

2. The device according to claim 1, wherein the predetermined trigger event includes an arrival of a periodic timing.

3. The device according to claim 2, wherein the arrival of the periodic timing includes once in N frames or once every t seconds.

4. A device comprising:
an image sensor:
at least one sensor configured to detect a position and an attitude of the device:
circuitry configured to:
acquire a first image by the image sensor:
transmit a first information including the position and the attitude of the device and the first image based on detection of a predetermined trigger event:
receive, based on the transmission of the first information and the first image, a second information including image feature quantities; and
control a display to display an augmented reality (AR) content based on an object which is identified by matching the image feature quantities and a second image which is acquired after the first image,
wherein the predetermined trigger event includes an arrival of a periodic timing,
wherein the arrival of the periodic timing includes once in N frames or once every t seconds, and wherein the periodic timing is less than a frequency of the object identification.

5. The device according to claim 1, wherein the predetermined trigger event includes an explicit instruction from a user via an input device.

6. The device according to claim 1, wherein the predetermined trigger event includes the object being identified as a result of the object moving out of the frame of the first image.

7. The device according to claim 1,
wherein the predetermined trigger event includes the object, which was not recognized in a previous frame of the first image, being recognized in the current frame of the first image.

8. A device comprising:
an image sensor;
at least one sensor configured to detect a position and an attitude of the device; and
circuitry configured to:
acquire a first image by the image sensor;
transmit a first information including the position and the attitude of the device and the first image based on detection of a predetermined trigger event;
receive, based on the transmission of the first information and the first image, a second information including image feature quantities; and
control a display to display an augmented reality (AR) content based on an object which is identified by matching the image feature quantities and a second image which is acquired after the first image,
wherein the predetermined trigger event includes a change in a position of the device, an orientation of the device, or a speed of the device.

9. A device comprising:
an image sensor;
at least one sensor configured to detect a position and an attitude of the device; and
circuitry configured to:
acquire a first image by the image sensor;
transmit a first information including the position and the attitude of the device and the first image based on detection of a predetermined trigger event;
receive, based on the transmission of the first information and the first image, a second information including image feature quantities; and
control a display to display an augmented reality (AR) content based on an object which is identified by matching the image feature quantities and a second image which is acquired after the first image,
wherein the AR content is overlaid on the second image at a position corresponding to the object in the second image.

10. A device comprising:
an image sensor;
at least one sensor configured to detect a position and an attitude of the device; and
circuitry configured to:
acquire a first image by the image sensor;
transmit a first information including the position and the attitude of the device and the first image based on detection of a predetermined trigger event;
receive, based on the transmission of the first information and the first image, a second information including image feature quantities; and
control a display to display an augmented reality (AR) content based on an object which is identified by matching the image feature quantities and a second image which is acquired after the first image, wherein the image feature quantities are filtered by acquiring only image feature quantities of objects located within a predetermined distance from the position of the device.

11. The device according to claim 1, wherein the second information includes the image feature quantities.

12. A device comprising:
an image sensor;
at least one sensor configured to detect a position and an attitude of the device; and
circuitry configured to:
acquire a first image by the image sensor;
transmit a first information including the position and the attitude of the device and the first image based on detection of a predetermined trigger event;
receive, based on the transmission of the first information and the first image, a second information including image feature quantities;
control a display to display an augmented reality (AR) content based on an object which is identified by matching the image feature quantities and a second image which is acquired after the first image, wherein the second information includes the image feature quantities;
extract an image feature quantity from the second image; and
identify the object by matching the extracted image feature quantity with image feature quantities included in the second information.

13. The device according to claim 1, wherein the object is included in the second image.

14. The device according to claim 1, wherein the image feature quantities are associated with objects in the second information.

15. The device according to claim 1, wherein the AR content includes information identifying the object.

16. The device according to claim 1, wherein the circuitry is further configured to:

detect a change in position or orientation of the device; and
transmit the first information based on the detected change in position or orientation.

17. A computer-implemented method, comprising:
acquiring a first image;
transmitting a first information including a position and an attitude of a device and the first image based on detection of a predetermined trigger event;
receiving, based on the transmission of the first information and the first image, a second information including image feature quantities; and
displaying an augmented reality (AR) content based on an object which is identified by matching the image feature quantities and a second image which is acquired after the first image,
wherein the predetermined trigger event includes detecting movement of an object out of a frame of the first image or movement of the object into a current frame of the first image.

18. A non-transitory computer-readable medium having embodied thereon a program, which when executed by a computer causes the computer to perform a method, the method comprising:
acquiring a first image;
transmitting a first information including a position and an attitude of a device and the first image based on detection of a predetermined trigger event;
receiving, based on the transmission of the first information and the first image, a second information including image feature quantities; and
displaying an augmented reality (AR) content based on an object which is identified by matching the image feature quantities and a second image which is acquired after the first image,
wherein the predetermined trigger event includes detecting movement of an object out of a frame of the first image or movement of the object into a current frame of the first image.

* * * * *